US012749841B2

(12) United States Patent
Purdy et al.

(10) Patent No.: US 12,749,841 B2
(45) Date of Patent: Sep. 29, 2026

(54) HIGH FREQUENCY PERFORMANCE HARDLINE CONNECTOR

(71) Applicant: PPC BROADBAND, INC., East Syracuse, NY (US)

(72) Inventors: Eric Purdy, Constantia, NY (US); Jordan Caviness, Liverpool, NY (US)

(73) Assignee: PPC BROADBAND, INC., East Syracuse, NY (US)

( * ) Notice: Subject to any disclaimer, the term of this patent is extended or adjusted under 35 U.S.C. 154(b) by 546 days.

(21) Appl. No.: 18/081,504

(22) Filed: Dec. 14, 2022

(65) Prior Publication Data

US 2023/0187868 A1 Jun. 15, 2023

Related U.S. Application Data

(60) Provisional application No. 63/361,391, filed on Dec. 15, 2021, provisional application No. 63/289,625, filed on Dec. 14, 2021.

(51) Int. Cl.

*H01R 13/426* (2006.01)
*H01R 9/05* (2006.01)
*H01R 103/00* (2006.01)

(52) U.S. Cl.

CPC ......... *H01R 13/426* (2013.01); *H01R 9/0524* (2013.01); *H01R 2103/00* (2013.01); *H01R 2201/18* (2013.01)

(58) Field of Classification Search

CPC ................ H01R 13/426; H01R 9/0524; H01R 2103/00; H01R 2201/18; H01R 24/44
See application file for complete search history.

(56) References Cited

U.S. PATENT DOCUMENTS

| | | | |
|---|---|---|---|
| 6,955,562 | B1 | 10/2005 | Henningsen |
| 7,950,961 | B2 | 5/2011 | Chabalowski et al. |
| 2006/0194474 | A1 | 8/2006 | Montena |
| 2021/0210891 | A1 | 7/2021 | Purdy et al. |

OTHER PUBLICATIONS

International Search Report and Written Opinion dated Apr. 18, 2023 in corresponding International Application No. PCT/US2022/052892, 15 pages.

*Primary Examiner* — Renee S Luebke
(74) *Attorney, Agent, or Firm* — MH2 TECHNOLOGY LAW GROUP LLP

(57) ABSTRACT

A hardline connector for providing high frequency performance includes a body portion configured to be coupled with an interface port. The body portion is configured to house a collet and an insulator, the collet includes a pin portion and a gripping portion that is configured to receive a center conductor of a hardline coaxial cable, and the gripping portion is configured to define a forward facing surface at a forward end of the gripping portion of the collet. The body portion is configured to minimize peaks and valleys of impedance levels within the connector relative to a desired 75 ohm impedance such that the hardline connector is configured to improve return loss performance over a wider frequency bandwidth without degrading electrical, mechanical, and environmental performance of the connector by minimizing peaks and valleys of impedance levels within the connector relative to a desired 75 ohm impedance. The hardline connector is configured to achieve a return loss of −20 dB or better over a frequency range of 5 MHz to 3 GHz.

24 Claims, 17 Drawing Sheets

HIGH FREQUENCY PERFORMANCE HARDLINE CONNECTOR

CROSS-REFERENCE TO RELATED APPLICATIONS

This application claims the benefit of U.S. Provisional Application No. 63/289,625, filed Dec. 14, 2021, pending, and U.S. Provisional Application No. 63/361,391, filed Dec. 15, 2021, pending, the disclosures of which are hereby incorporated by reference herein in their entirety.

BACKGROUND

The present disclosure relates generally to connectors for terminating coaxial cable. More particularly, the present invention relates to axially compressible connectors for hardline or semi-rigid coaxial cables.

Coaxial cables are commonly used in the cable television industry to carry cable TV signals to television sets in homes, businesses, and other locations. A hardline coaxial cable may be used to carry the signals in distribution systems exterior to these locations and a flexible coaxial cable is then often used to carry the signals within the interior of these locations. Hardline or semi-rigid coaxial cable is also used where a high degree of radio-frequency (RF) shielding is required.

The hardline cable includes a solid wire core or inner conductor, typically of copper or copper-clad aluminum, surrounded by a solid tubular outer conductor. The outer conductor is also usually made of copper or aluminum. Dielectric material or insulation separates the inner and outer conductors. The outer conductor is covered with a cable jacket or sheath of plastic to provide protection against corrosion and weathering.

Threaded cable connectors, as shown in U.S. Pat. Nos. 5,352,134 and 6,019,636, have been employed to provide more even compression of the connector. Such connectors typically utilize some form of clamping mechanism that radially compresses the outer conductor of the cable against a tubular mandrel upon axial threaded movement of the connector components to retain the cable in the hardline connector. The clamping mechanism may include a conical sleeve surrounded by an outer sleeve which forces the conical sleeve to radially compress upon axial movement of the outer sleeve with respect to the conical sleeve. The length of the conical closure sleeve typically closes the full length of the mechanism with equal forces around the circumference of the mandrel. The resulting forces closing down on the coaxial cable compress the cable around the outside of the mandrel creating a formed bond on the outside surface.

The ability of a connector to make a solid ground connection to the outer sheath of hardline CATV cables has always been required to achieve long term performance with respect to RFI shielding effectiveness of the connector as well as facilitate proper signal transmission through the connector with minimal loss or disruption of said signal. Connectors throughout the CATV industry have been made with all metal mandrel support sleeves and also have been made with all plastic mandrel support sleeves. While all-metal versions may hold up very well strength wise over time and temperature, the all-plastic versions are susceptible to creep and can weaken over time and temperature.

Some conventional hardline coaxial cable connectors experience less than desirable electrical performance resulting from poor return loss performance. The return loss performance can be degraded by mismatched impedance or reflection, particularly at the front end of hardline connectors. Outside diameter changes of the collet and inside diameter changes of the front body surrounding the collet cause impedance changes along the connector, which in turn hurts return loss performance of the connector.

For example, the industry standard for electrical performance of hardline connectors is −25 dB return loss over a frequency range of 5 MHz to 1794 MHz. Before that, the industry standard was −30 dB return loss over a frequency range of 5 MHz to 1002 MHz or 5 MHz to 1218 MHz. However, the continually increasing demand for more bandwidth for signal transmissions over copper wire has led to a desire to provide hardline connectors capable of improved electrical performance across a wider frequency bandwidth, for example, a bandwidth of 5 MHz to 3 GHz or greater. Until now, persons of ordinary skill in the art were not able to achieve such improved electrical performance at the wider bandwidth extending to 3 GHz or greater.

In the case of conventional hardline connectors (e.g., one piece, two piece, and three piece), as signals are transmitted over a wider frequency bandwidth, electrical performance of such connectors degrades. Consequently, persons of ordinary skill in the art thought that it was not possible to provide hardline connectors (e.g., one piece, two piece, or three piece) that could be configured to achieve satisfactory electrical performance (e.g. −20 dB or better) over a wider frequency bandwidth of 5 MHz to 3 GHz or greater.

It may be desirable to provide a hardline connector that overcomes one or more of the aforementioned disadvantages of hardline connectors. That is, it may be desirable to provide a hardline connector having improved return loss performance over a wider frequency bandwidth without degrading other performance of the connector, such as electrical, mechanical, and environmental performance. For example, it may be desirable to provide a hardline connector that is configured to achieve a return loss of −20 dB or better over a frequency range of 5 MHz to 3 GHz or greater, but persons of ordinary skill in the art have not been able to do so. Similarly, it may be desirable to provide a hardline connector that is configured to achieve a return loss of −30 dB to −35 dB over a frequency range of 5 MHz to 3 GHz or greater, but persons of ordinary skill in the art have not been able to do. Further, it may be desirable to provide a hardline connector that is configured to achieve a return loss of −20 dB or better over a frequency range of 5 MHz to 6 GHz, but persons of ordinary skill in the art have not been able to do.

It may be desirable to provide a hardline connector having components and geometrical features designed to achieve high levels of return loss performance, but persons of ordinary skill in the art have not been able to do. It may be desirable to eliminate areas within the connector having impedance levels that deviate significantly from 75 ohms (above or below) by bringing the peaks and valleys of such impedance levels closer to 75 ohms, but persons of ordinary skill in the art have not been able to do.

SUMMARY

In accordance with various embodiments of the present disclosure, a hardline connector for providing high frequency performance includes a front body assembly configured to be threadedly coupled with an interface port, a mid body assembly configured to be threadedly coupled with the front body assembly, and a back nut assembly configured to be threadedly coupled with the mid body housing.

In some aspects, the hardline connector is configured to achieve a return loss of −20 dB or better over a frequency range of 5 MHz to 3 GHz or greater, with such performance results being unexpected to one of ordinary skill in the art. In some aspects, the hardline connector is configured to achieve a return loss of −30 dB to −35 dB over a frequency range of 5 MHz to 3 GHz or greater, with such performance results being unexpected to one of ordinary skill in the art. In some aspects, the hardline connector is configured to achieve a return loss of −20 dB or better over a frequency range of 5 MHz to 6 GHz, with such performance results being unexpected to one of ordinary skill in the art.

In some aspects, the front body assembly includes a front body housing, a collet, and a nonconductive collet insulator configured to electrically insulate the collet from the front body housing.

In various aspects, the front body housing is configured to house the collet and the collet insulator.

According to some aspects, the collet includes a pin portion configured to extend through the collet insulator and extend from a forward end of the front body housing and a gripping portion configured to receive a center conductor of a hardline coaxial cable.

According to various aspects, the mid body assembly includes a mid body housing having a forward end configured to be threadedly coupled with a rearward end of the front body housing and a rearward end configured to receive the hardline coaxial cable.

In some aspects, the mid body assembly includes a nonconductive seizure bushing and a tubular conductive metal mandrel supported within the mid body housing.

According to various aspects, a forward facing surface of the seizure bushing includes a plurality of fins extending in the forward direction and being configured to be received in a plurality of longitudinal grooves in an inner wall of the front body housing when the mid body housing is threadedly coupled with the front body housing such that the seizure bushing is prevented from rotating relative to the front body housing.

In various aspects, the collet insulator includes radially spaced apart inner and outer cylindrical walls connected to one another at a forward end by a radial wall and radially extending ribs between the inner and outer cylindrical walls configured to provide radial strength to the collet insulator.

According to some aspects, the collet insulator extends from a rearward facing surface of an end wall at the forward end of the front body housing to a forward facing surface at a forward end of the gripping portion of the collet.

In some aspects, the mid body assembly includes a split tube clamp radially surrounding a portion of the conductive metal mandrel and a tubular ramp radially surrounding at least a portion of the tubular clamp.

In various aspects, the back nut assembly includes a back nut, a seal driver, and an O-ring.

According to some aspects, the back nut has a forward end configured to be threadedly coupled with a rearward end of the mid body housing and configured to receive the hardline coaxial cable.

According to various aspects, the ramp is configured to be moved forward relative to the clamp when the back nut is threadedly coupled with the mid body housing such that such that the ramp and the clamp are configured to engage one another, thereby causing the clamp to radially compress an outer conductor of the hardline coaxial cable onto the tubular conductive metal mandrel.

In some aspects, the seal driver is configured to be urged in a rearward direction relative to the back nut when the back nut is threadedly coupled with the mid body housing so as to compress the first O-ring to provide a seal between the back nut and the hardline coaxial cable.

According to various aspects, the connector is configured to improve return loss performance over a wider frequency bandwidth without degrading electrical, mechanical, and environmental performance of the connector by minimizing peaks and valleys of impedance levels within the connector relative a desired 75 ohm impedance.

Various aspects of the hardline coaxial connector, as well as other embodiments, objects, features and advantages of this disclosure, will be apparent from the following detailed description of illustrative embodiments thereof, which is to be read in conjunction with the accompanying drawings.

DETAILED DESCRIPTION OF EMBODIMENTS

Figure 1:
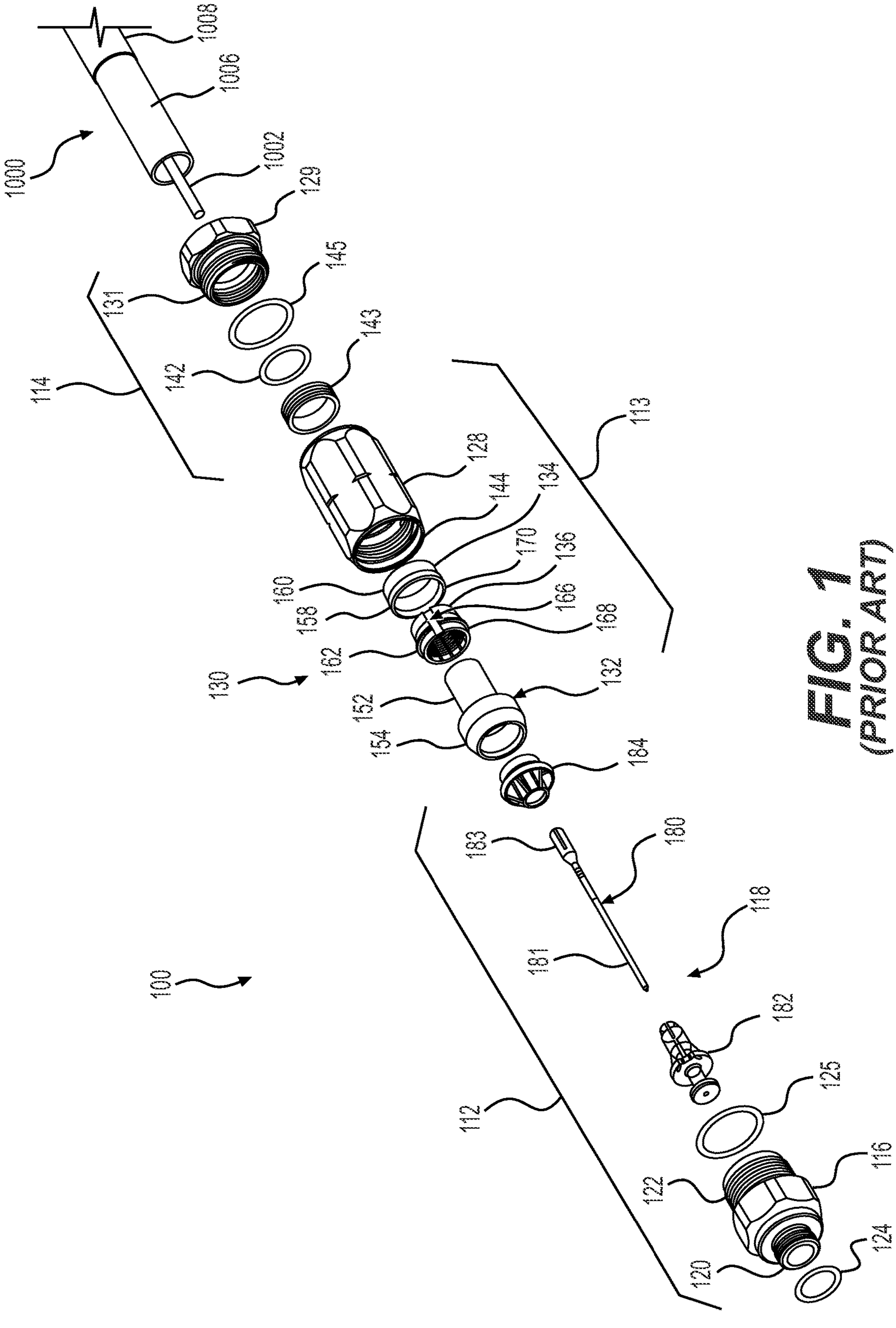
FIG. 1 (PRIOR ART)
FIG. 1 is an exploded perspective view of a conventional hardline connector and hardline cable.
Figure 2:
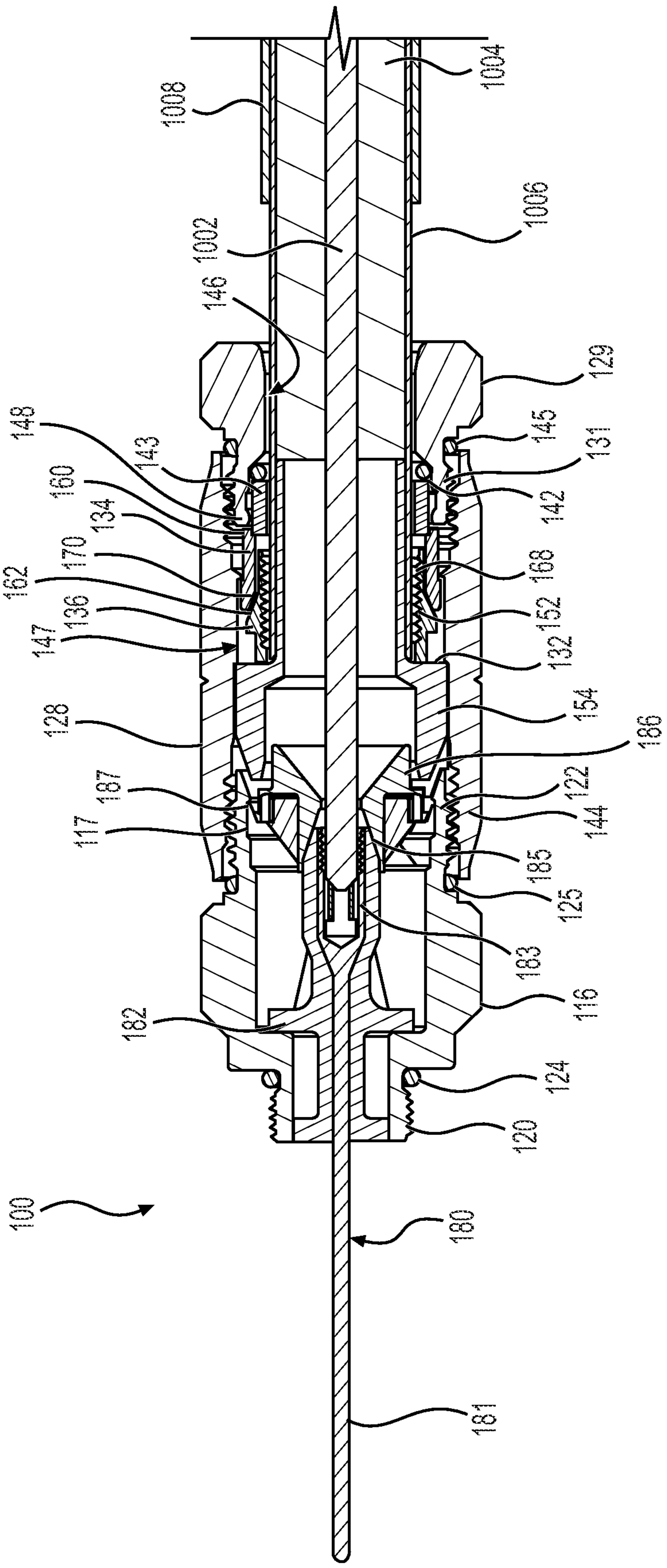
FIG. 2 (PRIOR ART)
FIG. 2 is a side cross-sectional view of the connector of FIG. 1.
Figure 3:
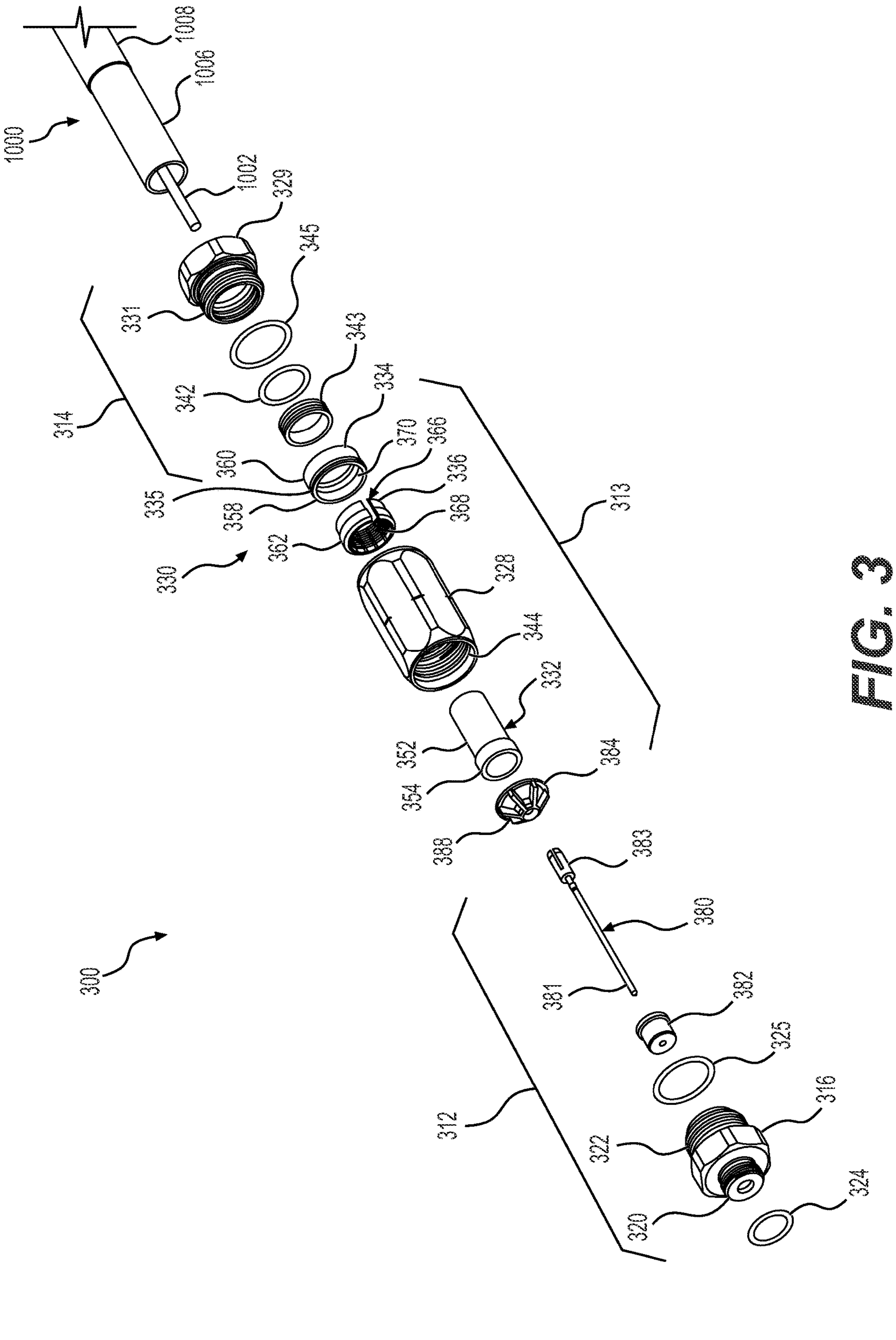
FIG. 3 is an exploded perspective view of an exemplary hardline connector and a hardline cable in accordance with various aspects of the disclosure.

Referring first to FIGS. 1 and 2, a conventional connector 100 is depicted. The connector 100 is configured to terminate hardline or semi-rigid coaxial cables. The connector 100 includes a front body assembly 112, a mid body assembly 113, and a back nut assembly 114 that are configured to be removably connected to one another. The connector 100 is configured such that a prepared end of a coaxial cable 1000 can be inserted into the rearward end of the back nut assembly 114 of the connector 100.

The coaxial cable 1000 generally includes a solid center conductor 1002 typically formed from a conductive metal, such as copper, copper clad aluminum, copper clad steel, or the like capable of conducting electrical signals therethrough. Surrounding the cable center conductor 1002 is a cable dielectric 1004, which insulates the cable center conductor to minimize signal loss. The cable dielectric 1004 also maintains a spacing between the cable center conductor 1002 and a cable outer conductor or shield 1006. The cable dielectric 1004 is often a plastic material, such as a polyethylene, a fluorinated plastic material, such as a polyethylene or a polytetrafluoroethylene, a fiberglass braid, or the like. The cable shield or outer conductor 1006 is typically made of metal, such as aluminum or copper, and is often extruded to form a hollow tubular structure with a solid wall having a smooth exterior surface. An insulative cable jacket 1008 surrounds the cable outer conductor 1006 to further seal the coaxial cable 1000. The cable jacket 1008 is typically made of plastic, such as polyvinylchloride, polyethylene, polyurethane, or polytetrafluoroethylene. When the cable is prepared for termination, a length of the dielectric 1004 is removed from the forward end of the cable 1000, leaving a radial space between the center conductor 1002 and the outer conductor 1006.

The connector 100 includes a plurality of components generally having a coaxial configuration about an axis defined by the center conductor 1002 of the coaxial cable 1000. The front body assembly 112 includes a front body housing 116 and a terminal pin assembly 118 supported by the front body housing 116. The front body housing 116 is formed with an axial bore configured to cooperatively contain the terminal pin assembly 118 and is made from an electrically conductive material such as aluminum, brass or the like. The front body housing 116 is formed with a threaded portion 120 at its forward end and a rearward threaded portion 122 at its rearward end opposite the forward threaded portion.

The terminal pin assembly 118 includes a conductive collet 180, a collet insulator 182, and a seizure bushing 184. The collet 180 includes a pin portion 181 and an opposite gripping portion 183. The gripping portion 183 includes a plurality of fingers configured to receive the center conductor 1002 of the cable 1000. The collet insulator 182 surrounds a portion of the collet 180, including the gripping portion 183, and provides insulation between the conductive collet 180 and the conductive front body housing 116. As shown, the collet insulator 182 extends from a forward end of the front body housing 116 to the rearward end of the collet 180. The pin portion 182 extends out of the front body housing 116 from the forward end and is configured to be received by an interface port (not shown), as would be understood by persons skilled in the art. The collet insulator 182 is also configured to assist with alignment of the collet 180 with the center conductor 1002 of the cable 1000 being terminated with the connector 100.

The forward threaded portion 120 of the front body housing is configured to cooperate with devices located in the field that receive the pin portion 181 of the collet 180. An O-ring 124 is provided around the forward threaded portion 120 to improve the seal that is made with the device receiving the pin portion 181 of the collet 180, and a portion of the exterior perimeter of the entry body housing 116 may be provided with a hexagonal shape to accommodate the use of tools during installation.

The seizure bushing 184 includes a forward end 185 an opposite rearward end 186. The forward end 185 includes an opening that tapers from the forward end 185 toward the rearward end 186 and is configured to receive a rearward end of the collet insulator 182 that tapers opposite to the forward end 185. The opposite tapers of the forward end 185 of the seizure bushing 184 and the rearward end of the collet insulator 182, which surrounds the gripping portion 183 of the collet 180, are configured to cause the gripping portion 183 of the collet 180 to be radially compressed onto the center conductor 1002 as the seizure bushing 184 is moved forwardly relative to the collet insulator 182 and the collet 180. The rearward end 186 includes an opening that tapers from the rearward end 186 toward the forward end 185 to assist with guiding the center conductor into the gripping portion 183 of the collet 180. The seizure bushing 184 also includes an annular flap 187 configured to be received in an annular groove 117 of the front body housing 116. The seizure bushing 184 may be made of a nonconductive material, for example, plastic, that is strong enough to radially compress the gripping portion 183 of the collet 180 on the center conductor 1002.

The rearward threaded portion 122 of the front body assembly 112 is configured to be threadedly coupled with the mid body assembly 113. The rearward threaded portion 122 includes an inward rim face 126 configured to engage an outer face of a mandrel 132 of the mid body assembly 113.

The mid body assembly 113 of the connector 100 includes a mid body housing 128 having an axial bore and a compression subassembly 130 rotatably supported within the axial bore. The compression subassembly 130 generally includes the mandrel 132, a ramp 134, and a clamp 136. An O-ring 125 is provided around the rearward threaded portion 122 to improve the seal between the front body housing 116 and the mid body housing 128.

The back nut assembly 114 of the connector 100 includes a back nut (or end cap) 129, seal driver 143, a first O-ring 142, and a second O-ring 145 arranged in a coaxial relationship about the central axis of the mid body housing 128. The first O-ring 142 improves the seal between the back nut 129 and the cable 1000 upon assembly, and the second O-ring 145 improves the seal between the back nut 129 and the mid body housing 128.

The mid body housing 128 is made from an electrically conductive material, such as aluminum, brass, or the like, and includes an internally threaded portion 144 at its forward end, which cooperates with the rearward threaded portion 122 of the entry body housing 116 so that the two connector portions may be threadedly coupled together. Similarly, the back nut 129 may be made from an electrically conductive material, such as aluminum, brass, or the like, and includes an externally threaded portion 131 at its forward end, which cooperates with a rearward threaded portion 133 of the mid body housing 128 so that the two connector portions may be threadedly coupled together. The exterior surface of the mid body housing 128 and/or the back nut 129 may be provided with a hexagonal shape to accommodate the use of tools to facilitate such threaded coupling.

The back nut 129 and the seal driver 143 are formed with an axial bore 146 dimensioned to receive the outside diameter of the cable 1000 in snug fitting relationship. At a forward end of the mid body housing 128, opposite the back nut 129, the mid body housing 128 is formed with a forward axial bore 147 communicating with the rearward axial bore 146 and dimensioned to accommodate the outer diameter of the mandrel 132. The back nut 129 is preferably formed with an annular shoulder 148 that prevents rearward movement of the ramp 134, and thus the clamp 136, as the clamp 136 is radially compressed, as will be discussed in further detail below.

The mandrel 132 includes a tubular body portion 152 terminating at a forward flanged portion 154. The mandrel 132 is made from metal. The outside diameter of the tubular body portion 152 of the mandrel 132 is dimensioned to be fitted within the inner diameter of the outer conductor 1006 of the coaxial cable 1000. Also, the inside diameter of the tubular body portion 152 is dimensioned to provide a passageway to receive the center conductor 102 of the cable 1000 after the cable has been prepared for termination, wherein a length of the dielectric 1004 has been removed from the forward end of the cable 1000. The mandrel 132 has an axial length that extends through the clamp 136 and into the back nut 129.

The ramp 134 is preferably made from an electrically conductive material, such as aluminum or brass, and includes an exterior surface 158 configured to be received within the forward axial bore 147 of the mid body housing 128. The ramp 134 terminates at a rearward edge 160, which is configured to engage the annular shoulder 148 of the back nut 129 and a forward end of the seal driver 143.

The clamp 136 is generally in the form of a split tube having a gap 166 extending the full length of the clamp. The gap 166 permits the diameter of the clamp 136 to be reduced more easily so that the clamp can be uniformly, radially compressed around the mandrel 132 upon rearward axial movement of the mandrel 132. An inner surface 168 of the clamp may be provided with structure to enhance gripping of the outer surface of the cable. Such structure may include internal threads, teeth or some other form of textured surface.

As mentioned above, the outer surface of the clamp 136 is provided with a circumferential ramped portion 162, which engages a forward end 170 of the ramp 134, opposite the rearward edge 160, upon forward axial movement of the ramp 134 to radially compress the clamp 136. The ramped portion 162 defines a conical segment of the clamp 136 that tapers radially inwardly in the rearward direction. A rearward portion of the clamp 136 is received in an axial bore of the ramp 134.

Operation and installation of the connector 100 will now be described. The front body assembly 112 is threadedly coupled with an interface port (not shown), by way of the threaded portion 120 of the front body housing 116. The end of the coaxial cable 1000 that is to be inserted through the back nut assembly 114 and into the rearward end of the mid body housing 128 is prepared in a conventional manner. The back nut assembly 114 is slid over the prepared end of the coaxial cable 1000, and the prepared end of the cable 100 is inserted into the mid body assembly 113 with the center conductor 1002 extending through the seizure bushing 184 and into the gripping portion 183 of the collet 180 and the outer conductor 1006 between the outer surface of the tubular body portion 152 of the mandrel 132 and the inner surface of the clamp 136.

The mid body housing 128 is threadedly coupled and rotated with respect to the front body housing 116 such that a forward end of the flange portion 154 of the mandrel 132 bears against a rearward facing shoulder of the seizure bushing 184 and urges the seizure bushing 184 in a forward direction relative to the collet insulator 182. The opposite tapering surfaces of the front end of the seizure bushing 184 and the rearward end of the collet insulator 182 engage one another, radially compressing the collet insulator 182 on the gripping portion 183 of the collet 182, which in turn radially compresses the gripping portion 183 of the collet 182 onto the center conductor 1002.

The back nut 129 is threadedly coupled and rotated with respect to the mid body housing 128. As the back nut 129 moves axially relative to the mid body housing 128, the seal driver 143 and the annular shoulder 148 of the back nut 129 urge the ramp 134 in a forward axial direction relative to the clamp 136. The forward translation of the ramp 134 causes the forward end 170 of the ramp 134 to engage the outer ramp portion 162 of the clamp 136, resulting in a radial compression of the clamp 136 onto the outer conductor 1006 of the cable 1000. The radial compression of the clamp 136 reduces the overall diameter of the clamp 136 and reduces the gap 166 of the ferrule so that the inner surface 168 of the clamp 136 bites down on the exposed portion of the outer cable conductor 1006 and presses the outer conductor 1006 against the mandrel 132.

Referring now to FIGS. 3-14A, an exemplary hardline connector 300, for example, a high frequency performance hardline connector, in accordance with various aspects of the disclosure is illustrated. The connector 300 is a three piece (or three body) connector configured to terminate hardline or semi-rigid coaxial cables. The connector 300 includes a front body assembly 312, a mid body assembly 313, and a back nut assembly 314 that are configured to be removably connected to one another. The connector 300 is configured such that the prepared end of the coaxial cable 1000 can be inserted into the rearward end of the back nut assembly 314, through the back nut assembly 314, and into the mid body assembly 313.

Figure 5A:
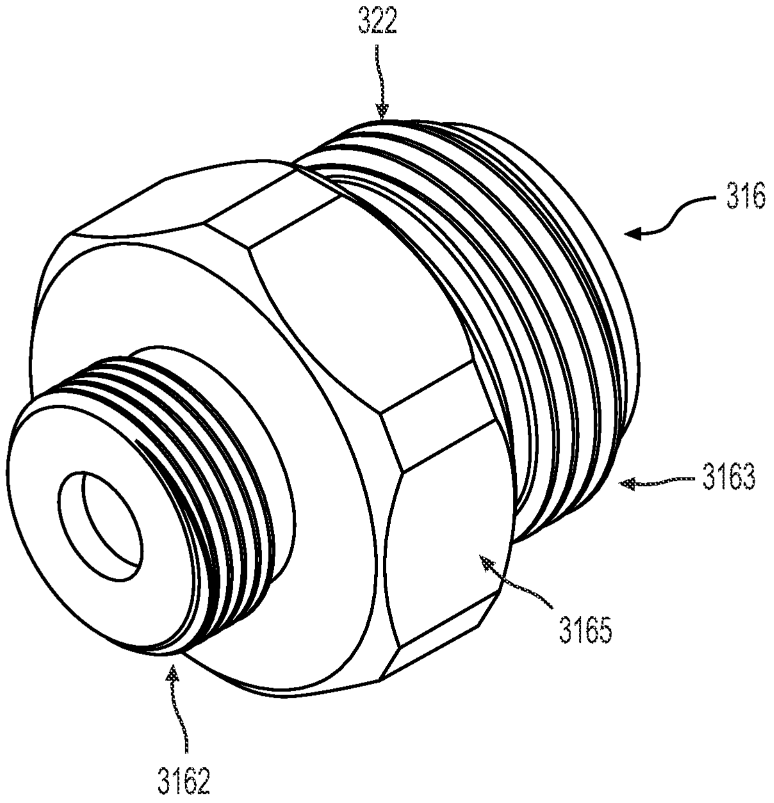
FIGS. 5A and 5B are front and rear perspective views of the front body housing of the hardline connector of FIG. 3.
Figure 5B:
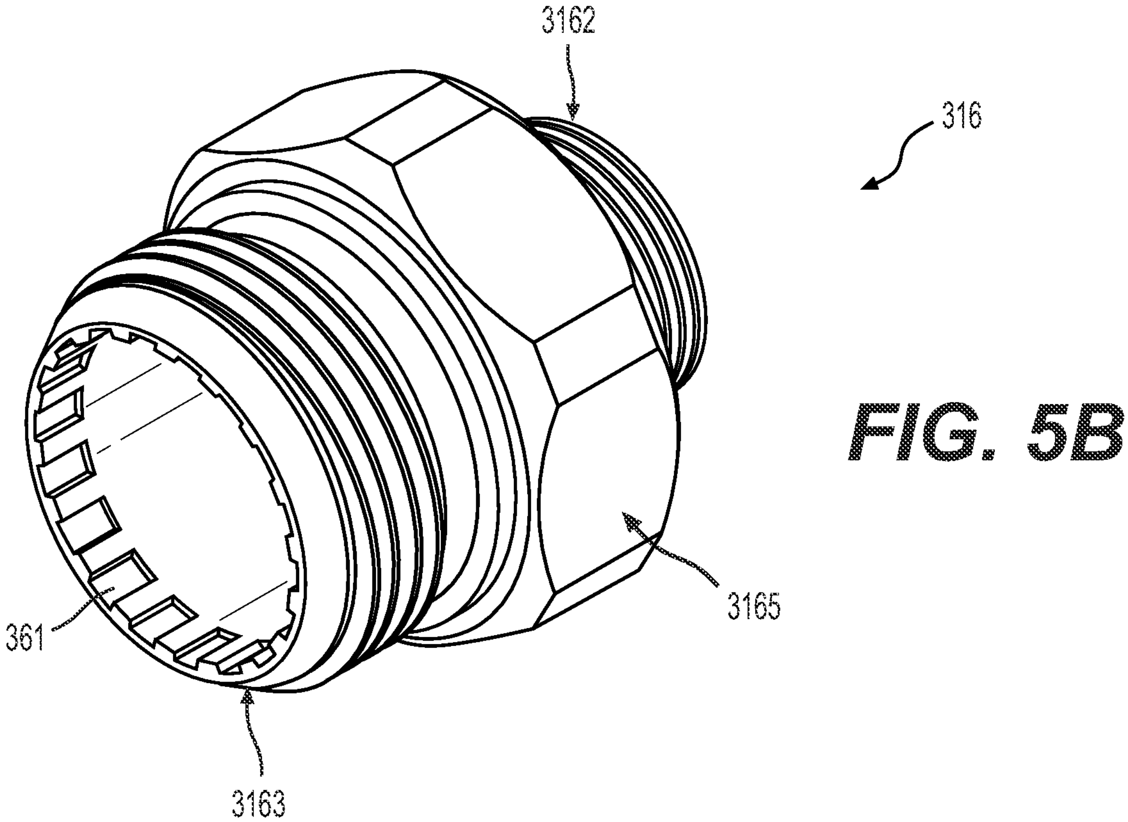
Figure 5C:
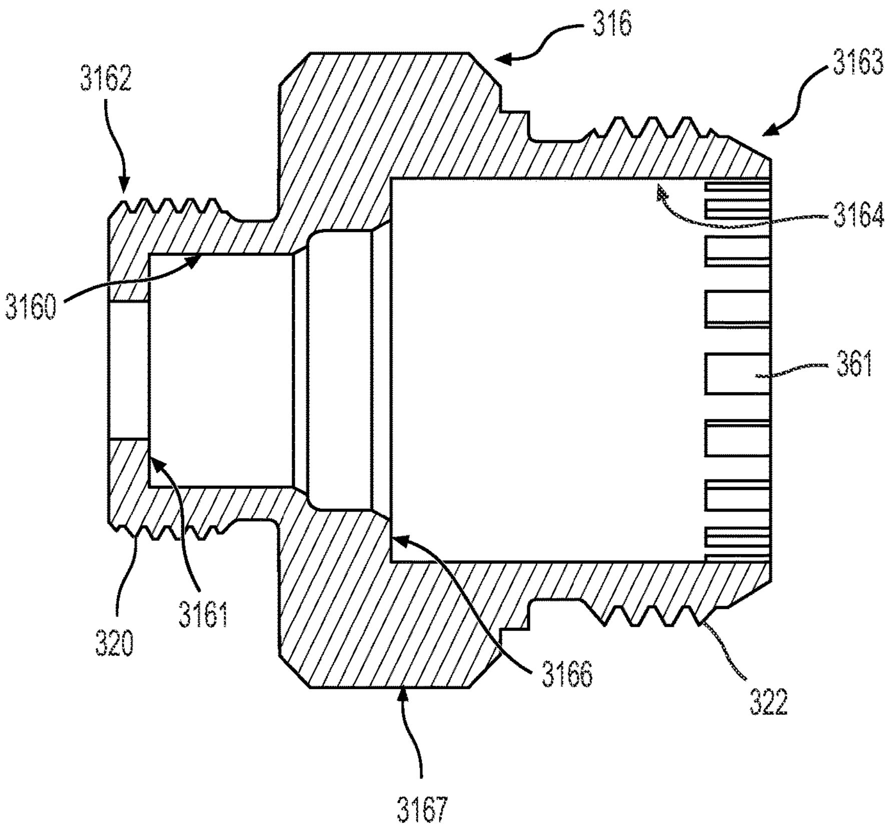
FIG. 5C is a side cross-sectional view of the front body housing of FIGS. 5A and 5B.

The connector 300 includes a plurality of components generally having a coaxial configuration about an axis defined by the center conductor 1002 of the coaxial cable 1000. The front body assembly 312 includes a front body housing 316 (or front or first body or front or first body portion) and a terminal pin assembly 318 supported by the front body housing 316. Referring to FIGS. 5A-5C, the front body housing 316 is formed with a first axial bore or receiving structure 3160 configured to cooperatively contain the terminal pin assembly 318 and is made from an electrically conductive material such as aluminum, brass or the like. The front body housing 316 is formed with a threaded portion or engagement portion 320 at its forward end 3162 and a rearward threaded portion or engagement portion 322 at its rearward end 3163 opposite the forward threaded portion 320. The front body housing 316 includes a second axial bore or receiving structure 3164 that extends from a rearward facing surface 3166 of an end wall at middle portion 3167 of the front body housing 316 to the rearward end 3163 and has a substantially constant inside diameter along its length. For example, the inside diameter of the second axial bore 3164 may be constant except for a plurality of longitudinal grooves or slots 361 at the rearward end 3163, which are discussed in more detail below.

Figure 7A:
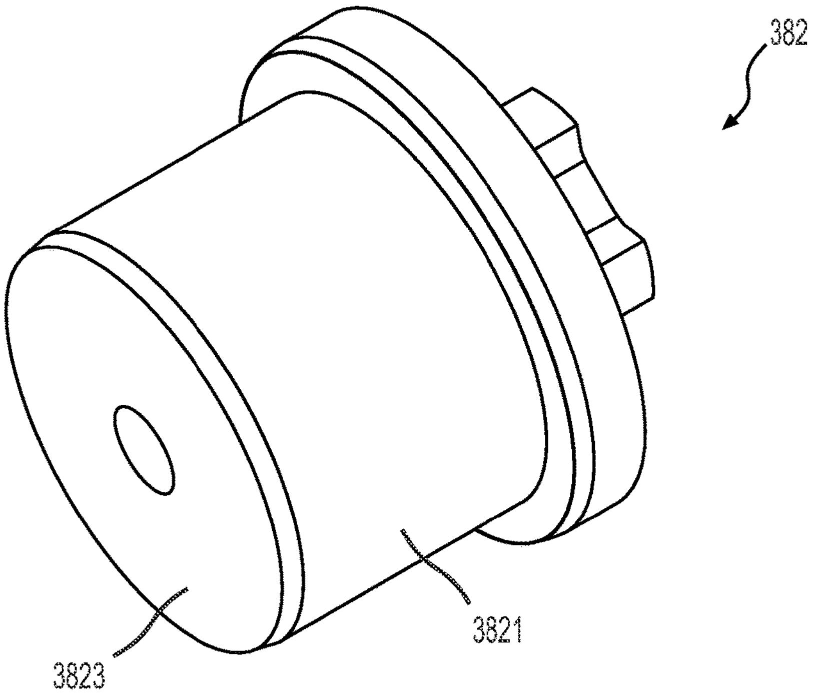
FIGS. 7A and 7B are front and rear perspective views of the collet insulator of the hardline connector of FIG. 3.
Figure 6A:
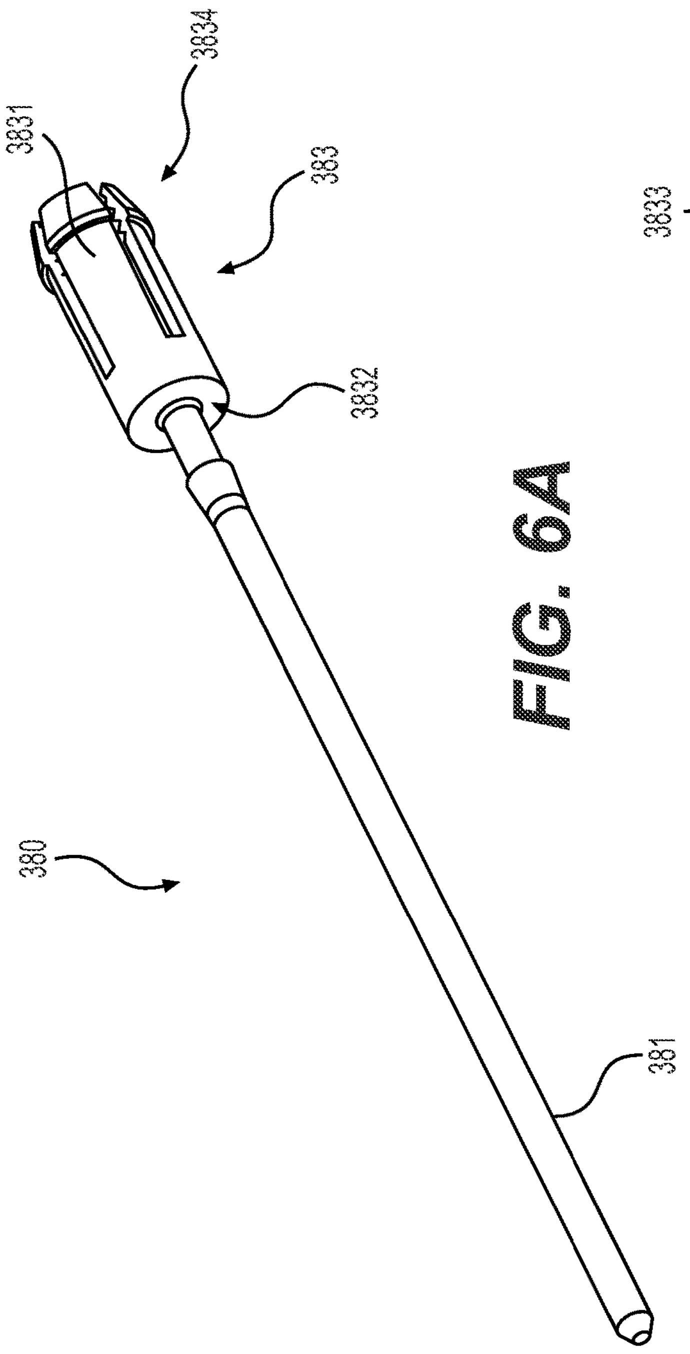
FIG. 6A is a perspective view of the collet of the hardline connector of FIG. 3.
Figure 6B:
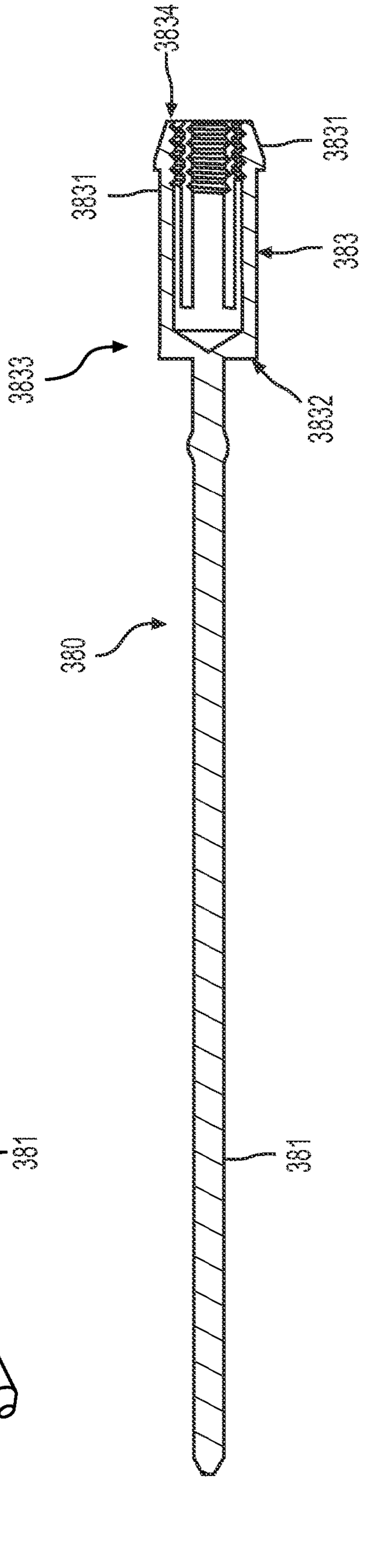
FIG. 6B is a side cross-sectional view of the collet of FIG. 6A.
Figure 7B:
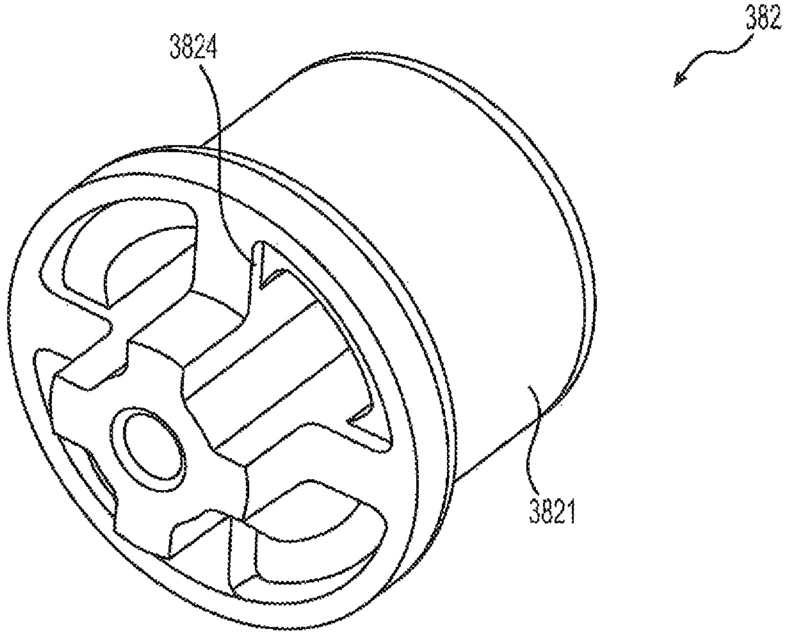
Figure 7C:
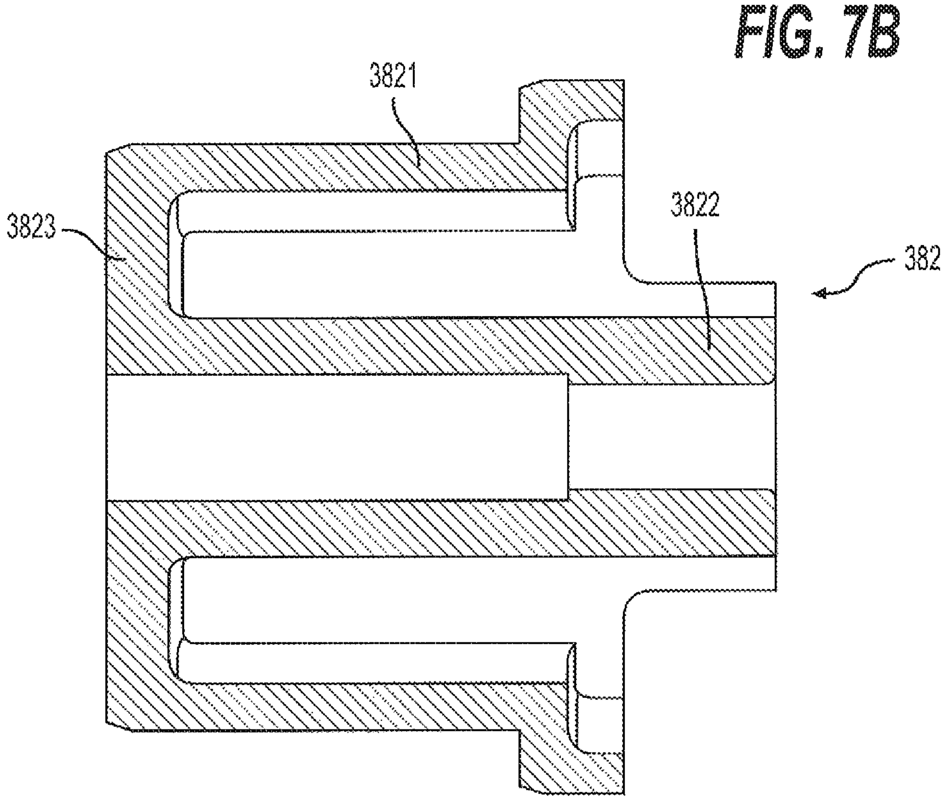
FIG. 7C is a side cross-sectional view of the collet insulator of FIGS. 7A and 7B.

As shown in FIGS. 6A and 6B, the terminal pin assembly 318 includes a conductive collet 380 extending through an insulator 382, for example, a collet insulator. The collet 380 includes a pin portion 381 and an opposite gripping portion 383. The gripping portion 383 includes a plurality of retaining members or fingers 3831, for example, flexible fingers, configured to receive the center conductor 1002 of the cable 1000. The collet insulator 382 surrounds a portion of the collet 380, excluding the gripping portion 383, and provides insulation between the conductive collet 380 and the conductive front body housing 316. As illustrated in FIGS. 7A-7C, the collet insulator 382 may be formed as inner and outer cylindrical walls 3821, 3822 connected to one another at a forward end by a radial wall 3823 and may include radially extending ribs 3824 between the inner and outer cylindrical walls 3821, 3822 that provide radial strength to the collet insulator 382. As shown, the collet insulator 382 extends from a rearward facing surface 3161 of an end wall at the forward end 3162 of the front body housing 316 to a forward facing surface 3832 at a forward end 3833 of the gripping portion 383 of the collet 380. The pin portion 381 extends out of the front body housing 316 from the forward end 3162 and is configured to be received by an interface port (not shown), as would be understood by persons skilled in the art. The collet insulator 382 is also configured to assist with alignment of the collet 380 with the center conductor 1002 of the cable 1000 being terminated with the connector 300.

The forward threaded portion 320 of the front body housing 316 is configured to cooperate with devices located in the field that receive the pin portion 381 of the collet 380. An O-ring 324 is provided around the forward threaded portion 320 to improve the seal that is made with the device receiving the pin portion 381 of the collet 380, and a portion 3165 of the exterior perimeter of the entry body housing 316 may be provided with a hexagonal shape to accommodate the use of tools during installation. The rearward threaded portion 322 of the front body housing 316 is configured to be threadedly coupled with the mid body assembly 313.

Figure 8A:
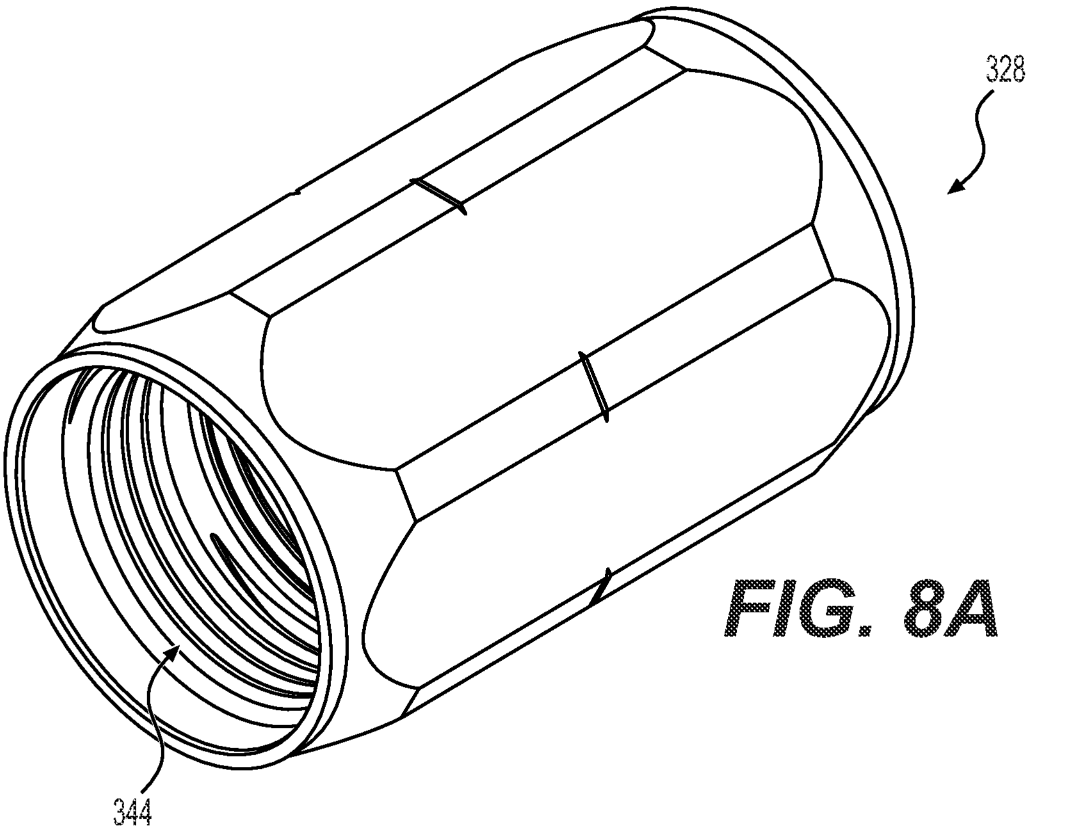
FIG. 8A is a perspective view of the mid body housing of the hardline connector of FIG. 3.
Figure 8B:
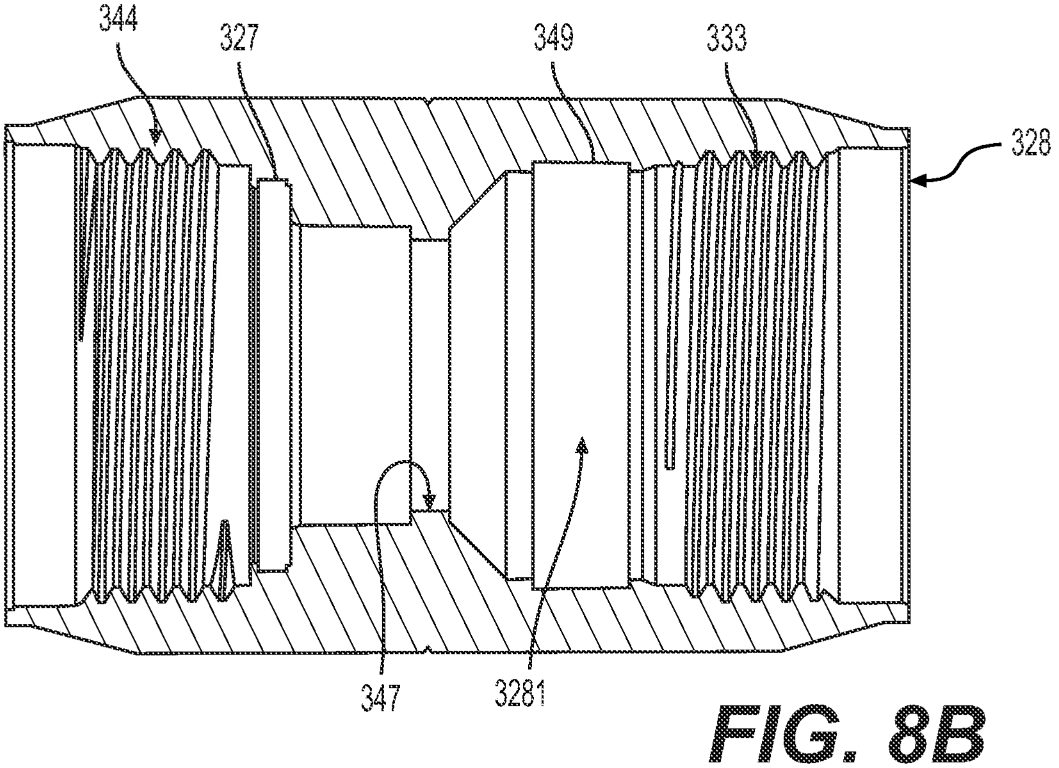
FIG. 8B is a side cross-sectional view of the mid body housing of FIG. 8A.

As shown in FIGS. 8A and 8B, the mid body assembly 313 of the connector 300 includes a mid body housing 328 (or mid or second body or mid or second body portion) having an axial bore or receiving structure, a compression subassembly 330 rotatably supported within the axial bore, and an anti-rotation structure 384, for example, a seizure bushing. The compression subassembly 330 generally includes a conductive mandrel 332, a ramp 334, and a clamp 336. An O-ring 325 is provided around the rearward threaded portion 322 to improve the seal between the front body housing 316 and the mid body housing 328.

Figure 9A:
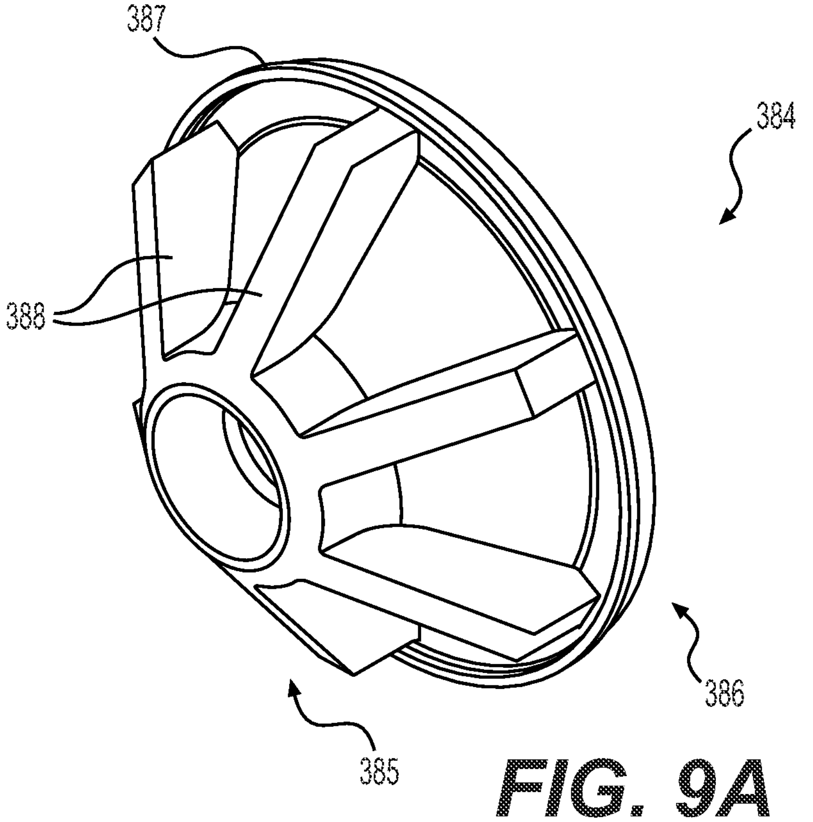
FIG. 9A is a perspective view of the seizure bushing of the hardline connector of FIG. 3.
Figure 9B:
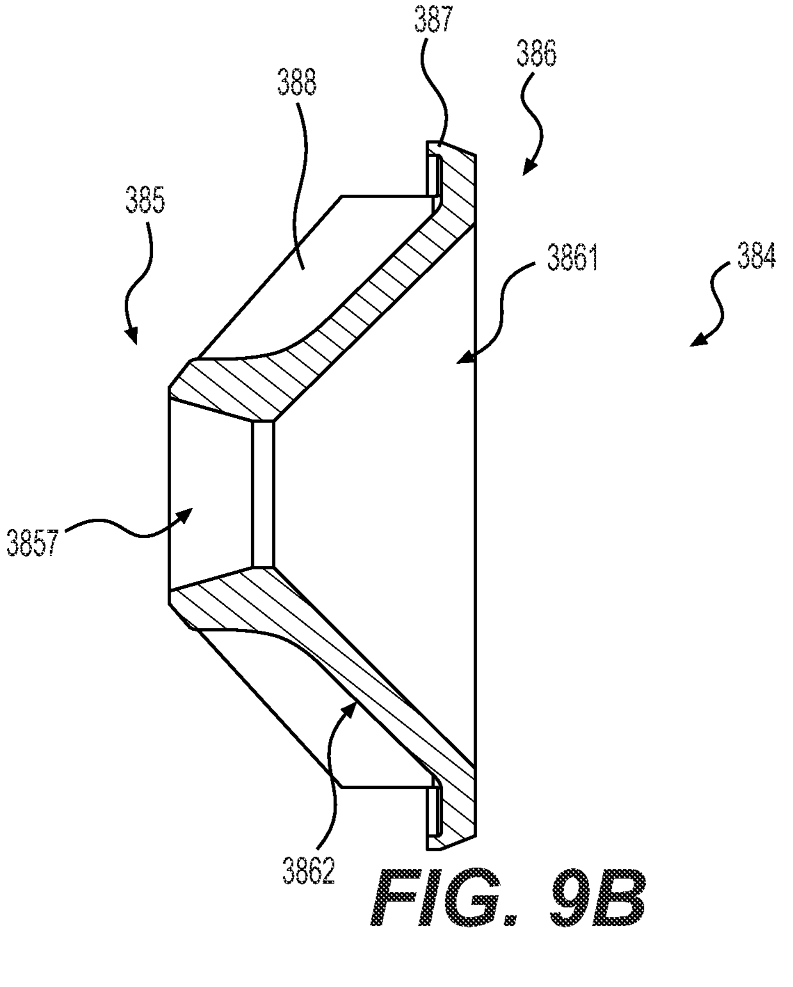
FIG. 9B is a side cross-sectional view of the seizure bushing of FIG. 9A.
Figure 10A:
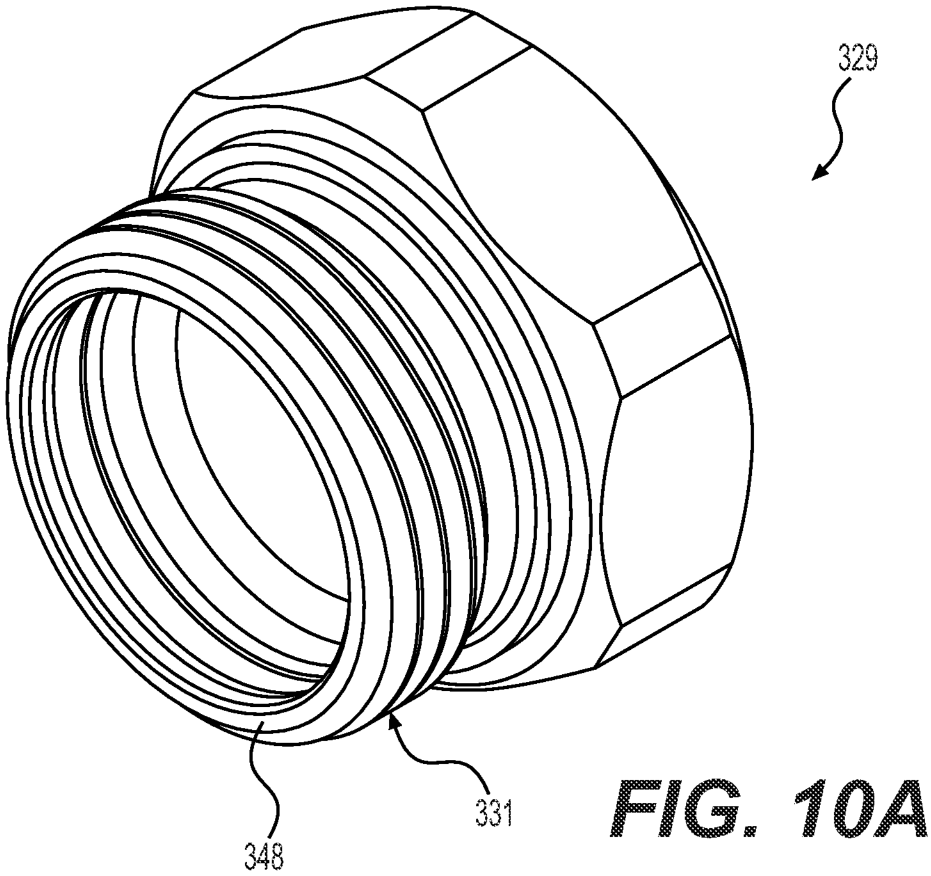
FIG. 10A is a perspective view of the back nut of the hardline connector of FIG. 3.
Figure 10B:
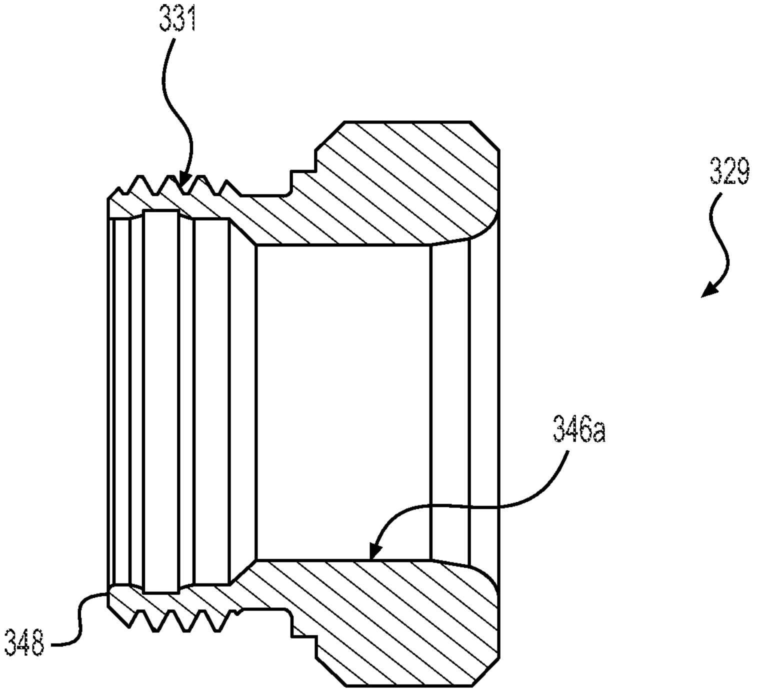
FIG. 10B is a side cross-sectional view of the back nut of FIG. 10A.

Referring to FIGS. 9A and 9B, the seizure bushing 384 includes a forward end 385 an opposite rearward end 386. The forward end 385 includes an opening or receiving structure 3851 that tapers from the forward end 385 toward the rearward end 386 and is configured to receive a rearward end 3834 of the gripping portion 383 of the collet 380, which tapers opposite to the forward end 385. The opposite tapers of the forward end 385 of the seizure bushing 384 and the gripping portion 383 of the collet 380, are configured to cause the gripping portion 383 of the collet 380 to be radially compressed onto the center conductor 1002 as the seizure bushing 384 is moved forwardly relative to the collet 380. The rearward end 386 includes an opening or receiving structure 3861 that tapers from the rearward end 386 toward the forward end 385 to assist with guiding the center conductor into the gripping portion 383 of the collet 380. The seizure bushing 384 also includes an annular rim 387 configured to be received in an annular groove 327 of the mid body housing 328 such that the seizure bushing 384 is retained in the mid body housing 328 prior to the mid body housing 328 being coupled with the front body housing 316. A forward facing surface 3862 of the rearward end 386 of the seizure bushing 384 is conically shaped and includes a plurality of engagement structures or fins 388 that extend in the forward direction. The front body housing 316 includes a plurality of engagement features 361, such as longitudinal grooves or slots, that are sized and arranged to receive a radially outer portion of the fins 388 when the seizure bushing 384 is disposed in a rearward end of the front body housing 316. The number of grooves 361 should be equal to or greater than the number of fins 388 such that each fin 388 can occupy a groove 361. When the fins 388 are received in the grooves 361, the seizure bushing 384 is prevented from rotating relative to the front body housing 316, thereby preventing twisting of the cable 1000. The seizure bushing 384 is made of a nonconductive material, for example, plastic, that is strong enough to radially compress the collet 380 on the center conductor 1002.

The back nut assembly 314 of the connector 300 includes a back nut or end cap 329 (or back or third body or back or third body portion), seal driver 343, a first O-ring 342, and a second O-ring 345 arranged in a coaxial relationship about the central axis of the mid body housing 328. The first O-ring 342 is configured to improve the seal between the back nut 329 and the cable 1000 upon assembly, and the second O-ring 345 is configured to improve the seal between the back nut 329 and the mid body housing 328.

The mid body housing 328 is made from an electrically conductive material, such as aluminum, brass, or the like, and includes an internally threaded portion or engagement portion 344 at its forward end, which cooperates with the rearward threaded portion 322 of the entry body housing 316 so that the two connector portions may be threadedly coupled together. Similarly, the back nut 329 may be made from an electrically conductive material, such as aluminum, brass, or the like, and includes an externally threaded portion or engagement portion 331 at its forward end, which cooperates with a rearward threaded portion or engagement portion 333 of the mid body housing 328 so that the two connector portions may be threadedly coupled together. The exterior surface of the mid body housing 328 and/or the back nut 329 may be provided with a hexagonal shape to accommodate the use of tools to facilitate such threaded coupling.

As shown in FIGS. 10A, 10B, 14A, and 14B, the back nut 329 and the seal driver 343 are formed with an axial bore 346 (346*a*, 346*b*) dimensioned to receive the outside diameter of the outer conductor 1006 of the cable 1000 (or the outside diameter of the jacket 1008 depending on the type of cable 1000 being used) in snug fitting relationship. At a forward end of the mid body housing 328, opposite the back nut 329, the mid body housing 328 is formed with a forward axial bore 347 communicating with the rearward axial bore 346 and dimensioned to accommodate the outer diameter of the mandrel 332. The mid body housing 328 may have an inner surface that includes an annular groove or receiving feature 349 configured to receive an annular projection or engagement structure 335 extending radially outward from an outer surface of the ramp 334 so as to limit rearward movement of the ramp 334, and thus the clamp 336, relative to the mid body housing 328.

Figure 11A:
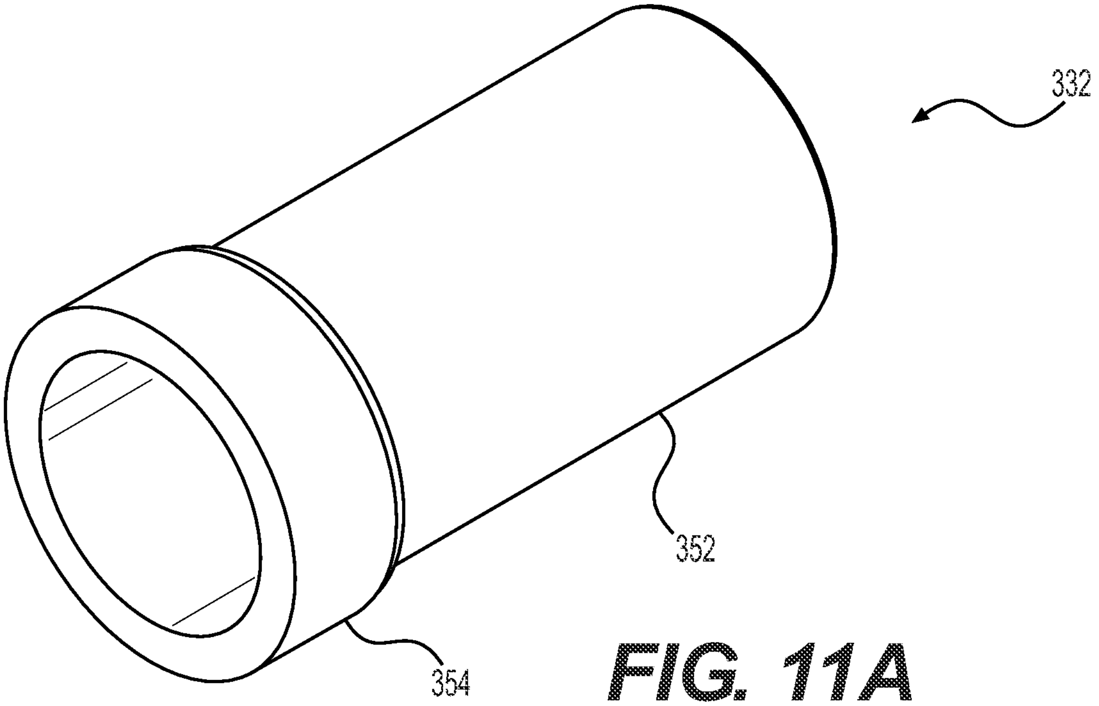
FIG. 11A is a perspective view of the mandrel of the hardline connector of FIG. 3.
Figure 11B:
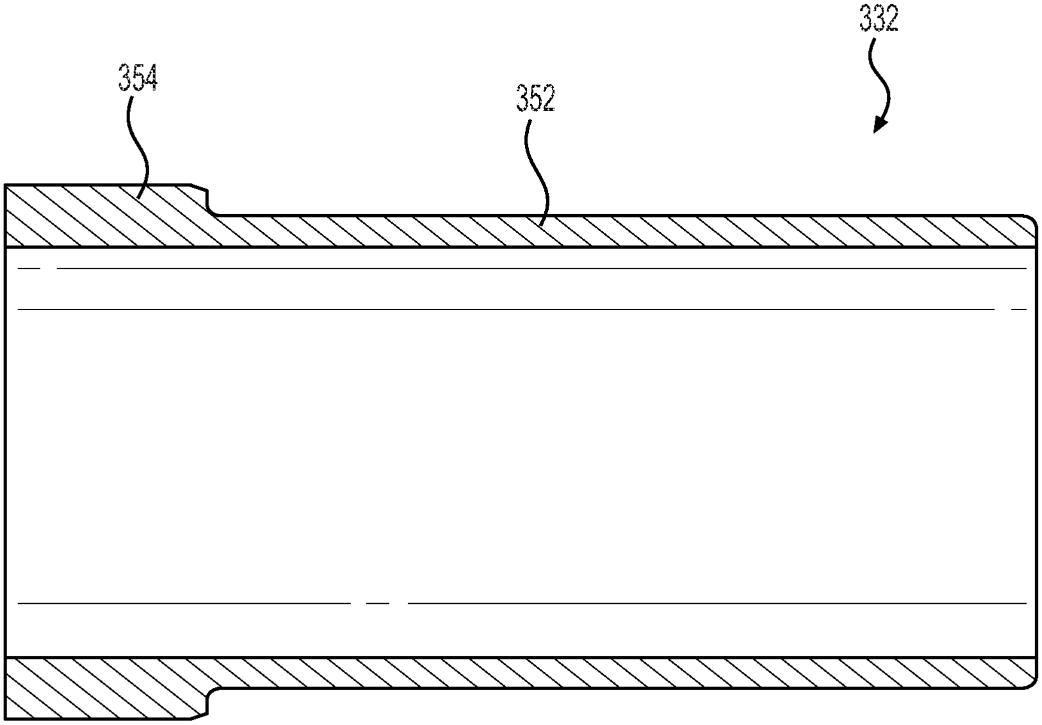
FIG. 11B is a side cross-sectional view of the mandrel of FIG. 11A.

As shown in FIGS. 11A and 11B, the mandrel 332 includes a body portion 352, for example, a tubular body portion, terminating at a forward flanged portion 354. The mandrel 332 comprises a conductive material, for example, metal, a conductive polymer, or the like. The outside diameter of the tubular body portion 352 of the mandrel 332 is dimensioned to be fitted within the inner diameter of the outer conductor 1006 of the coaxial cable 1000. Also, the inside diameter of the tubular body portion 352 is dimensioned to provide a passageway to receive the center conductor 302 of the cable 1000 after the cable has been prepared for termination, wherein a length of the dielectric 1004 has been removed from the forward end of the cable 1000. The mandrel 332 has an axial length that extends through the clamp 336 and into the back nut 329.

Figure 12A:
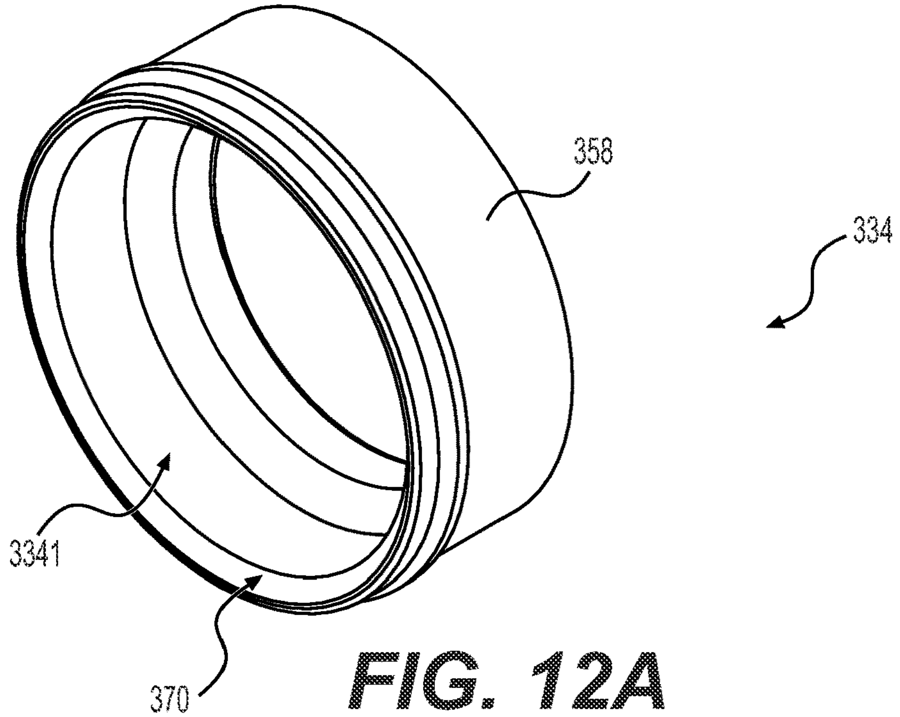
FIG. 12A is a perspective view of the ramp of the hardline connector of FIG. 3.
Figure 12B:
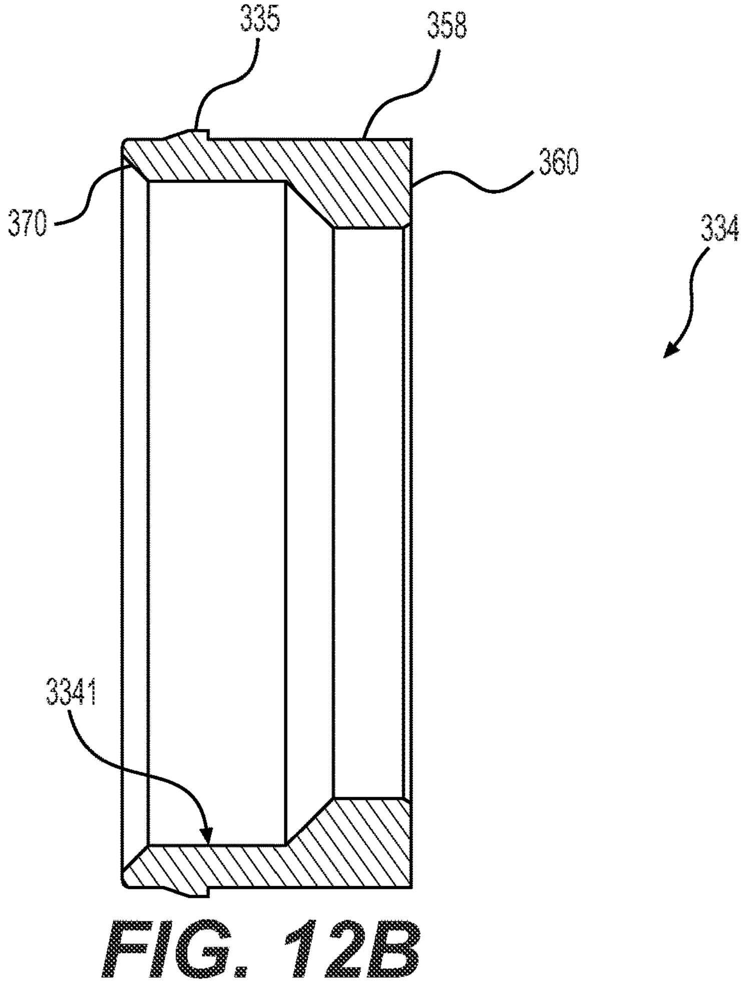
FIG. 12B is a side cross-sectional view of the ramp of FIG. 12A.

Referring now to FIGS. 12A and 12B, the ramp 334 is preferably made from an electrically conductive material, such as aluminum or brass, and includes an exterior surface 358 configured to be received within the forward axial bore 347 of the mid body housing 328. The ramp 334 terminates at a rearward edge 360, which is configured to engage the annular shoulder 348 of the back nut 329 and a forward end 3431 of the seal driver 343.

Figure 13A:
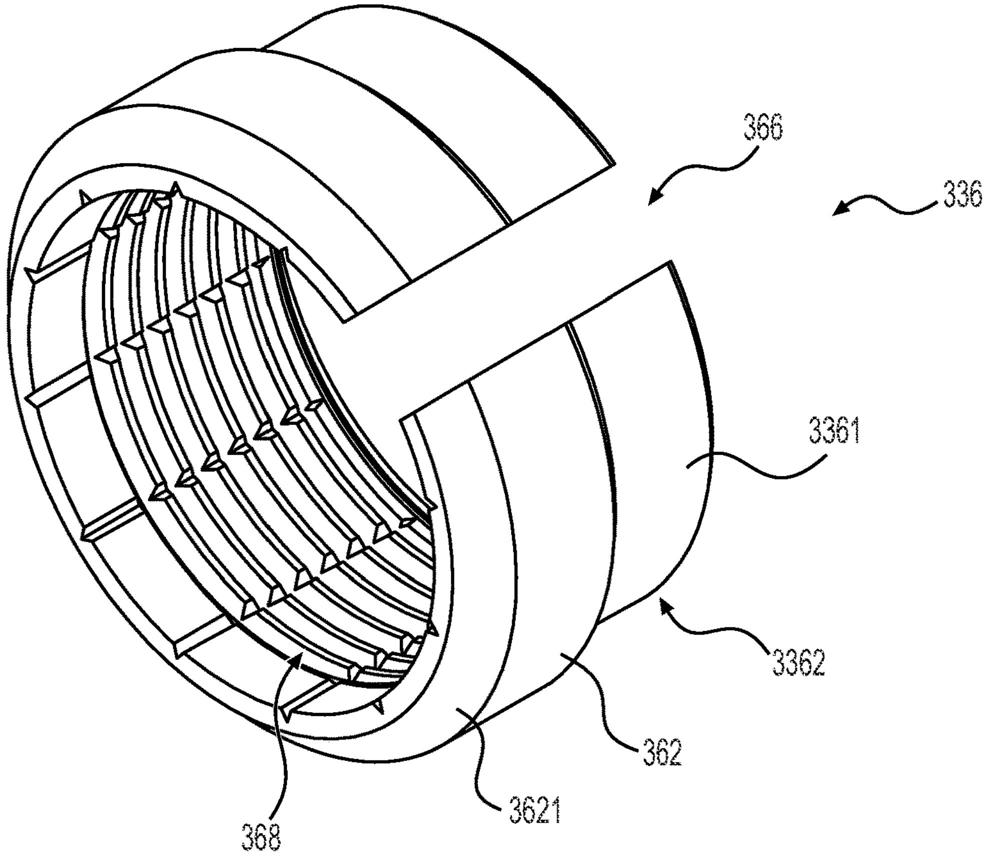
FIG. 13A is a perspective view of the clamp of the hardline connector of FIG. 3.
Figure 13B:
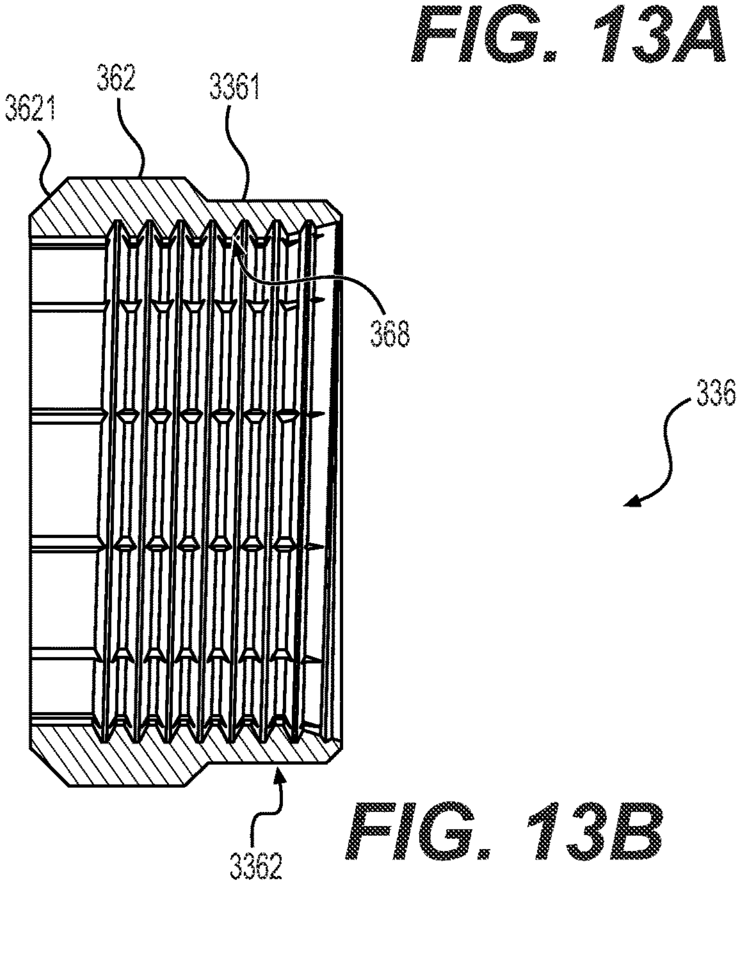
FIG. 13B is a side cross-sectional view of the clamp of FIG. 13A.
Figure 14A:
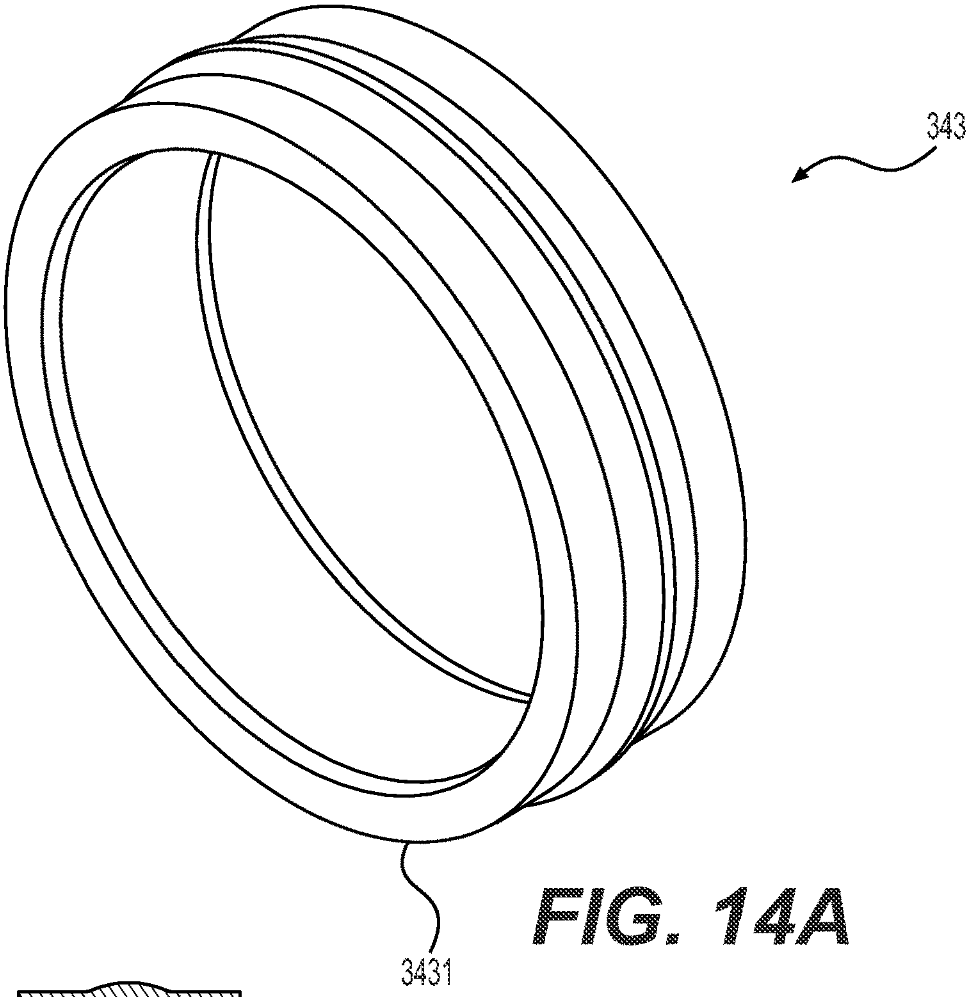
FIG. 14A is a perspective view of the seal driver of the hardline connector of FIG. 3.
Figure 14B:
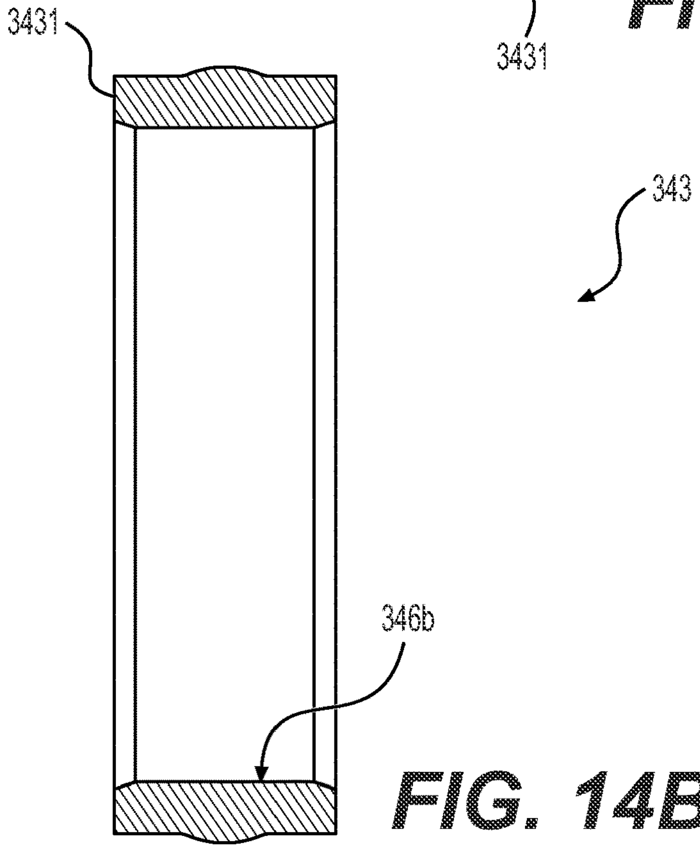
FIG. 14B is a side cross-sectional view of the seal driver of FIG. 14A.

As illustrated in FIGS. 13A and 13B, the clamp 336 is generally in the form of a split tube 3361 having a gap 366 extending the full length of the clamp. The gap 366 permits the diameter of the clamp 336 to be reduced more easily so that the clamp can be uniformly, radially compressed around the mandrel 332 upon rearward axial movement of the mandrel 332. An inner surface 368 of the clamp may be provided with structure to enhance gripping of the outer surface of the cable. Such structure may include internal threads, teeth, or some other form of textured surface.

As mentioned above, the outer surface of the clamp 336 is provided with a circumferential ramped portion 362, which engages a forward end 370 of the ramp 334, opposite the rearward edge 360, upon forward axial movement of the ramp 334 to radially compress the clamp 336. The ramped portion 362 defines a conical segment 3621 of the clamp 336 that tapers radially inwardly in the rearward direction. A rearward portion 3362 of the clamp 336 is received in an axial bore 3341 of the ramp 334.

Operation and installation of the connector 300 will now be described. The front body assembly 312 is threadedly coupled with an interface port (not shown), by way of the threaded portion 320 of the front body housing 316. The end of the coaxial cable 1000 that is to be inserted through the back nut assembly 314 and into the rearward end of the mid body housing 328 is prepared in a conventional manner. The back nut assembly 314 is slid over the prepared end of the coaxial cable 1000, and the prepared end of the cable 300 is inserted into the mid body assembly 313 with the center conductor 1002 extending through the seizure bushing 384 and into the gripping portion 383 of the collet 380 and the outer conductor 1006 between the outer surface of the tubular body portion 352 of the mandrel 332 and the inner surface of the clamp 336.

The mid body housing 328 is threadedly coupled and rotated with respect to the front body housing 316 such that the seizure bushing 384 is urged in a forward direction relative to the front body housing 316 and the collet 380. As the seizure bushing 384 enters the front body housing, each of the fins 388 is received by one of the grooves 361 in the inner wall of the front body housing 316 to prevent relative rotation between the seizure bushing 384 and the front body housing 316. The opposite tapering surfaces of the front end of the seizure bushing 384 and the gripping portion 383 of the collet 380 engage one another, radially compressing the gripping portion 383 of the collet 380 onto the center conductor 1002.

The back nut 329 is threadedly coupled and rotated with respect to the mid body housing 328. As the back nut 329 moves axially relative to the mid body housing 328, the seal driver 343 and the annular shoulder 348 of the back nut 329 urge the ramp 334 in a forward axial direction relative to the clamp 336 and the mid body housing 328. The forward translation of the ramp 334 causes (i) a forward tapered end of the clamp 336 to engage an oppositely tapered inner wall of the mid body housing 328, (ii) the forward end 370 of the ramp 334 to engage the outer ramp portion 362 of the clamp 336, and/or (iii) a tapered inner surface of the clamp 336 to engage a rearward end of the clamp 336, thereby resulting in radial compression of the clamp 336 onto the outer conductor 1006 of the cable 1000 at multiple regions along a length of the clamp 336. The radial compression of the clamp 336 reduces the overall diameter of the clamp 336 and reduces the gap 366 so that the inner surface 368 of the clamp 336 bites down on the exposed portion of the outer cable conductor 1006 and presses the outer conductor 1006 against the mandrel 332. The axial movement of the back nut 329 relative to the mid body housing 328 also urges the seal driver 343 in a rearward direction to compress the first O-ring 342 to provide an environmental seal between the back nut 329 and the outer conductor 1006 or the jacket 1008 of the cable 1000.

Figure 4:
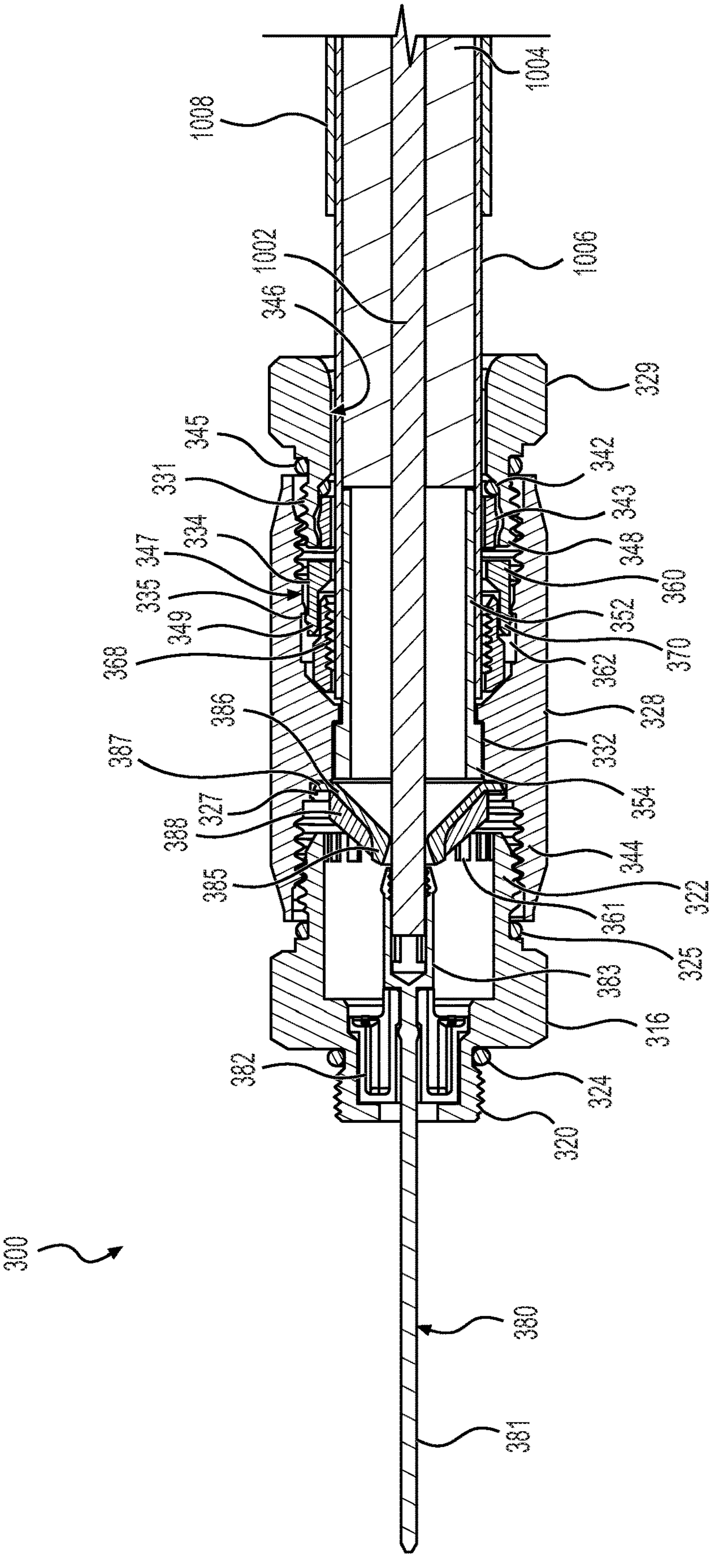
FIG. 4 is a side cross-sectional view of the connector and cable of FIG. 3.

As best illustrated in FIG. 4, the high frequency hardline connector 300 according to the disclosure includes features that minimize peaks and valleys of impedance levels within the connector relative to a desired 75 ohm impedance (i.e., the connector is nearly perfectly matched to 75-ohm hardline cable) so as to achieve improved electrical performance over a frequency range of 5 MHz to 3 GHz or greater. For example, the substantially constant inside diameter of the second bore portion 3164 of the front body housing 316 that surrounds the gripping portion 383 of the collet 380 and/or the substantially constant outside diameter of the gripping portion 383 of the collet 380 reduce impedance changes along the connector 300, for example, along a front end of the connector, which improves return loss and insertion loss performance of the connector 300. By moving the seizure bushing 384 to the mid body housing 328, the inside diameter of the second bore portion 3164 of the front body housing 316 can be substantially constant along its length. Also, by implementing a step transition from the pin portion 381 of the collet 380 to the gripping portion 383, the outside diameter of the gripping portion 383 can be substantially constant along its length.

As another example, the collet insulator 382 includes a reduced amount of material relative to conventional insulators, which minimizes peaks and valleys of impedance levels within the connector relative to a desired 75 ohm impedance (i.e., the connector is nearly perfectly matched to 75-ohm hardline cable) so as to achieve improved electrical performance over a frequency range of 5 MHz to 3 GHz or greater. As described above, the collet insulator 382 includes the inner and outer cylindrical walls 3821, 3822 that are separated by a hollowed out region. Also, the length of the collect insulator 382 is reduced to a distance between the rearward facing surface 3161 of the front body housing 316 and the forward facing surface 3832 of the gripping portion 383 of the collet 380, and the collet insulator 382 does not surround the gripping portion 383. The collet insulator 382 thus improves return loss and insertion loss performance of the connector 300.

Figure 15:
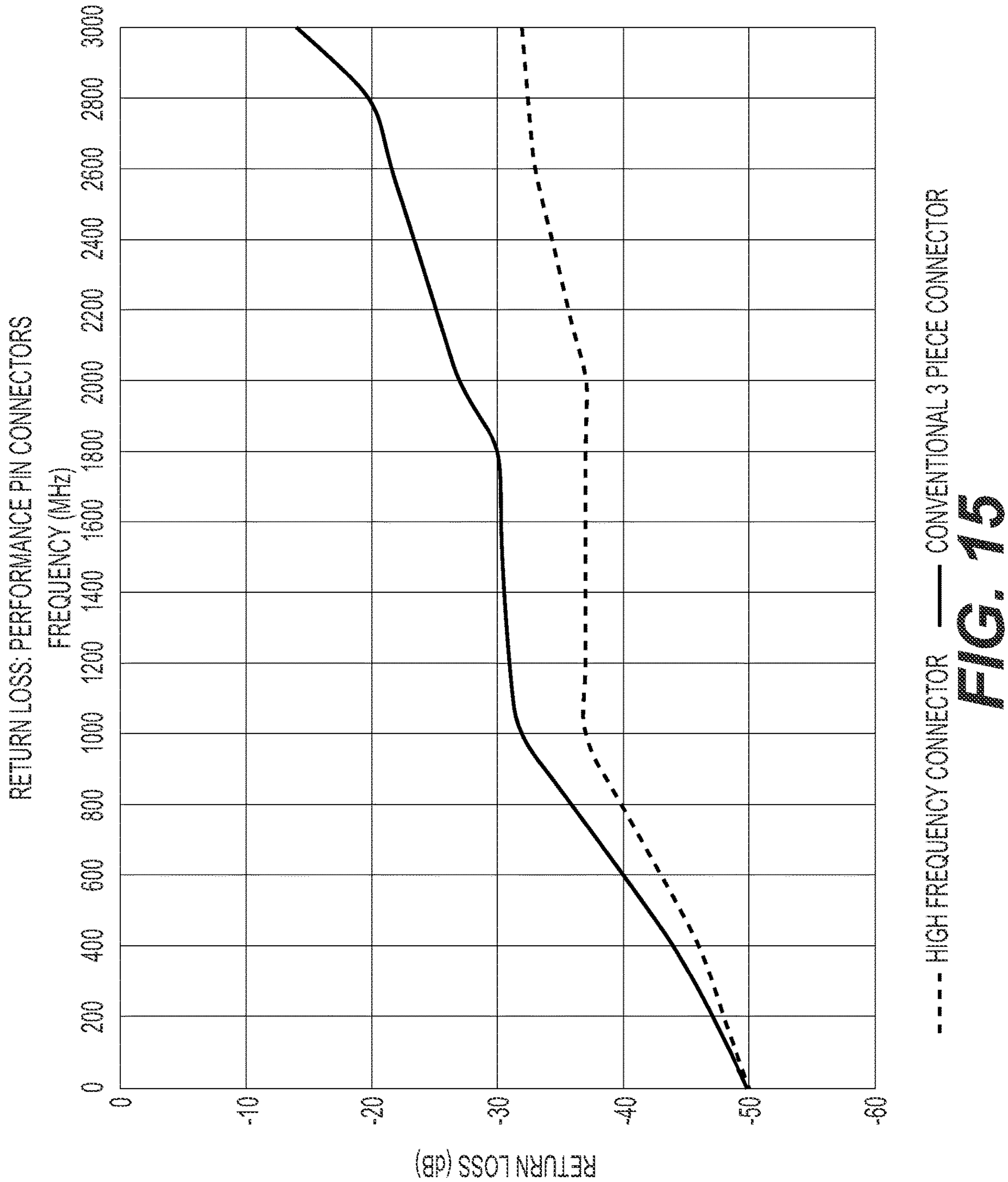
FIG. 15 is a graph illustrating return loss of the exemplary hardline connector of FIG. 3 versus a conventional connector.

As shown in FIG. 15, the high frequency hardline connector 300 according to the disclosure is configured to achieve a return loss of −20 dB or better over a frequency range of 5 MHz to 3 GHz or greater, with such performance results being unexpected to one of ordinary skill in the art. In some aspects, the hardline connector 300 is configured to achieve a return loss of −30 dB to −35 dB over a frequency range of 5 MHz to 3 GHz or greater, with such performance results being unexpected to one of ordinary skill in the art. In some aspects, the hardline connector 300 is configured to achieve a return loss of −20 dB or better over a frequency range of 5 MHz to 6 GHz, with such performance results being unexpected to one of ordinary skill in the art.

Figure 16:
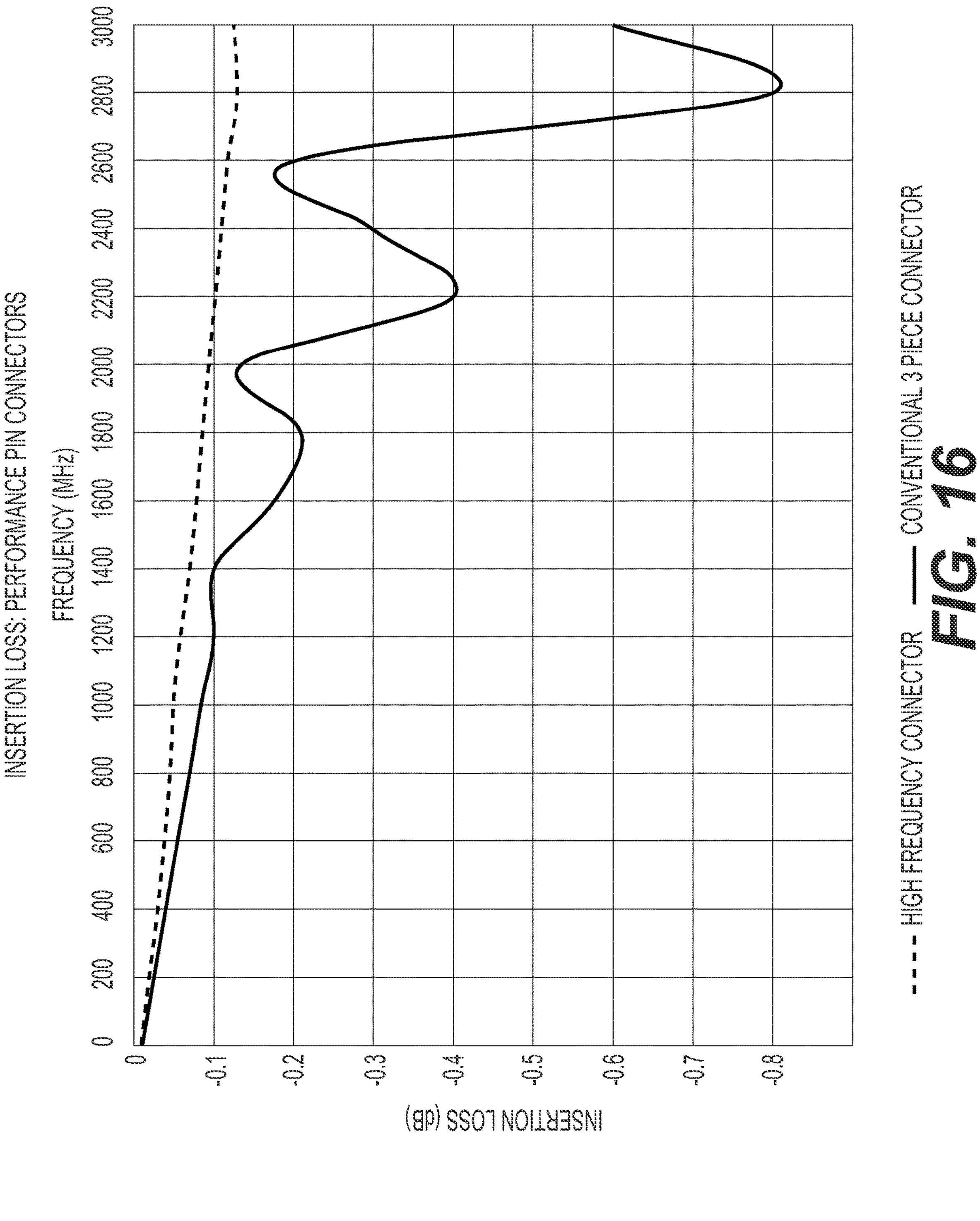
FIG. 16 is a graph illustrating insertion loss of the exemplary hardline connector of FIG. 3 versus a conventional connector.

As shown in FIG. 16, the high frequency hardline connector 300 according to the disclosure is configured to achieve improved insertion loss over a frequency range of 5 MHz to 3 GHz or greater, with such performance results being unexpected to one of ordinary skill in the art. In some aspects, the hardline connector 300 is configured to achieve improved insertion loss over a frequency range of 5 MHz to 6 GHz, with such performance results being unexpected to one of ordinary skill in the art. In some aspects, the hardline connector 300 is configured to achieve an insertion loss of −0.2 dB or better over a frequency range of 5 MHz to 6 GHz, with such performance results being unexpected to one of ordinary skill in the art. In some aspects, the hardline connector 300 is configured to achieve an insertion loss of −0.15 dB or better over a frequency range of 5 MHz to 3 GHz, with such performance results being unexpected to one of ordinary skill in the art.

Although the illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

Various changes to the foregoing described and shown structures will now be evident to those skilled in the art. Accordingly, the particularly disclosed scope of the invention is set forth in the following claims.

What is claimed is:

1. A hardline connector for providing high frequency performance comprising:

a front body assembly configured to be threadedly coupled with an interface port;

a mid body assembly configured to be threadedly coupled with the front body assembly;

a back nut assembly configured to be threadedly coupled with the mid body assembly;

wherein the front body assembly includes a front body housing, a collet, and a nonconductive collet insulator configured to electrically insulate the collet from the front body housing;

wherein the front body housing is configured to house the collet and the collet insulator;

wherein the collet includes a pin portion that is configured to extend through the collet insulator and extend from a forward end of the front body housing and a gripping portion that is configured to receive a center conductor of a hardline coaxial cable;

wherein the collet includes a stepped transition from the pin portion to the gripping portion that is configured to define a forward facing surface at a forward end of the gripping portion of the collet;

wherein the mid body assembly includes a mid body housing and a nonconductive seizure bushing;

wherein the mid body housing includes a forward end that is configured to be threadedly coupled with a rearward end of the front body housing and a rearward end that is configured to receive the hardline coaxial cable;

wherein a forward facing surface of the seizure bushing includes a plurality of fins that are configured to extend in the forward direction and to be received in a plurality of longitudinal grooves in an inner wall of the front body housing when the mid body housing is threadedly coupled with the front body housing such that the seizure bushing is prevented from rotating relative to the front body housing;

wherein a bore portion of the front body housing that surrounds the gripping portion of the collet includes a substantially constant inside diameter and the gripping portion of the collet includes a substantially constant outside diameter so as to minimize peaks and valleys of impedance levels within the connector relative to a desired 75 ohm impedance such that the hardline connector is configured to improve return loss performance over a wider frequency bandwidth without degrading electrical, mechanical, and environmental performance of the connector by minimizing peaks and valleys of impedance levels within the connector relative to a desired 75 ohm impedance;

wherein the collet insulator extends from a rearward facing surface of an end wall at the forward end of the front body housing to the forward facing surface at the forward end of the gripping portion of the collet without covering the gripping portion and includes radially spaced apart inner and outer cylindrical walls connected to one another at a forward end by a radial wall and configured to define a hollowed out region so as to minimize peaks and valleys of impedance levels within the connector relative to a desired 75 ohm impedance such that the hardline connector is configured to improve return loss performance over a wider frequency bandwidth without degrading electrical, mechanical, and environmental performance of the connector; and wherein the hardline connector is configured to achieve a return loss of −20 dB or better over a frequency range of 5 MHz to 6 GHz.

2. The hardline connector of claim 1, wherein the hardline connector is configured to achieve a return loss of −30 dB to −35 dB or better over a frequency range of 5 MHz to 3 GHz.

3. The hardline connector of claim 1, wherein the hardline connector is configured to achieve an insertion loss of −0.2 dB or better over a frequency range of 5 MHz to 6 GHz.

4. The hardline connector of claim 1, wherein the hardline connector is configured to achieve an insertion loss of −0.15 dB or better over a frequency range of 5 MHz to 3 GHz.

5. The hardline connector of claim 1, wherein the mid body assembly includes a tubular conductive metal mandrel supported within the mid body housing.

6. The hardline connector of claim 5, wherein the mid body assembly includes a clamp radially surrounding a portion of the conductive metal mandrel and a ramp radially surrounding at least a portion of the clamp; and wherein the ramp is configured to be moved forward relative to the clamp when the back nut assembly is threadedly coupled with the mid body assembly such that such that the ramp and the clamp are configured to engage one another, thereby causing the clamp to radially compress an outer conductor of the hardline coaxial cable onto the tubular conductive metal mandrel.

7. The hardline connector of claim 6, wherein clamp comprises a split ring, and the ramp comprises a tubular ramp.

8. The hardline connector of claim 6, wherein the back nut assembly includes a back nut, a seal driver, and an O-ring;

wherein the back nut has a forward end that is configured to be threadedly coupled with a rearward end of the mid body housing and to receive the hardline coaxial cable; and wherein the seal driver is configured to be urged in a rearward direction relative to the back nut when the back nut is threadedly coupled with the mid body housing so as to compress the O-ring to provide a seal between the back nut and the hardline coaxial cable.

9. A hardline connector for providing high frequency performance comprising:

a front body portion configured to be coupled with an interface port;

a mid body portion configured to be coupled with the front body portion;

a back nut portion configured to be coupled with the mid body portion; and wherein the front body portion is configured to house a conductive collet and a nonconductive collet insulator configured to electrically insulate the collet from the front body portion;

wherein the collet includes a pin portion that is configured to extend from a forward end of the front body portion and a gripping portion that is configured to receive a center conductor of a hardline coaxial cable;

wherein the collet includes a stepped transition from the pin portion to the gripping portion that is configured to define a forward facing surface at a forward end of the gripping portion of the collet;

wherein the front body portion includes a bore portion that is configured to surround the gripping portion of the collet and includes a substantially constant inside diameter, and the gripping portion of the collet includes a substantially constant outside diameter so as to minimize peaks and valleys of impedance levels within the connector relative to a desired 75 ohm impedance such that the hardline connector is configured to improve return loss performance over a wider frequency bandwidth without degrading electrical, mechanical, and environmental performance of the connector by minimizing peaks and valleys of impedance levels within the connector relative to a desired 75 ohm impedance;

wherein the collet insulator extends from a rearward facing surface of an end wall at the forward end of the front body portion to the forward facing surface at the forward end of the gripping portion of the collet without covering the gripping portion and includes radially spaced apart inner and outer cylindrical walls connected to one another at a forward end by a radial wall and configured to define a hollowed out region so as to minimize peaks and valleys of impedance levels within the connector relative to a desired 75 ohm impedance such that the hardline connector is configured to improve return loss performance over a wider frequency bandwidth without degrading electrical, mechanical, and environmental performance of the connector; and wherein the hardline connector is configured to achieve a return loss of −20 dB or better over a frequency range of 5 MHz to 6 GHz.

10. The hardline connector of claim 9, wherein the hardline connector is configured to achieve a return loss of −30 dB to −35 dB or better over a frequency range of 5 MHz to 3 GHz.

11. The hardline connector of claim 9, wherein the hardline connector is configured to achieve an insertion loss of −0.15 dB or better over a frequency range of 5 MHz to 3 GHz.

12. The hardline connector of claim 9, wherein the mid body portion is configured to house a nonconductive seizure bushing and includes a forward end that is configured to be threadedly coupled with a rearward end of the front body portion and a rearward end that is configured to receive the hardline coaxial cable; and wherein a forward facing surface of the seizure bushing includes a plurality of fins that are configured to extend in the forward direction and to be received in a plurality of longitudinal grooves in an inner wall of the front body portion when the mid body portion is threadedly coupled with the front body portion such that the seizure bushing is prevented from rotating relative to the front body portion.

13. The hardline connector of claim 12, wherein the mid body portion is configured to house a conductive mandrel.

14. The hardline connector of claim 13, wherein the mid body portion is configured to house a clamp radially surrounding a portion of the conductive mandrel and a ramp radially surrounding at least a portion of the clamp; and wherein the ramp is configured to be moved forward relative to the clamp when the back nut portion is coupled with the mid body portion such that such that the ramp and the clamp are configured to engage one another, thereby causing the clamp to radially compress an outer conductor of the hardline coaxial cable onto the conductive mandrel.

15. The hardline connector of claim 14, wherein clamp comprises a split ring, and the ramp comprises a tubular ramp.

16. The hardline connector of claim 13, wherein the back nut portion is configured to house a seal driver;

wherein the back nut portion has a forward end that is configured to be threadedly coupled with a rearward end of the mid body portion and to receive the hardline coaxial cable; and wherein the seal driver is configured to be urged in a rearward direction relative to the back nut portion when the back nut portion is threadedly coupled with the mid body portion so as to compress an O-ring to provide a seal between the back nut portion and the hardline coaxial cable.

17. A hardline connector for providing high frequency performance comprising:

a front body portion configured to be coupled with an interface port;

a mid body portion configured to be coupled with the front body portion;

a back nut portion configured to be coupled with the mid body portion;

wherein the front body portion is configured to house a conductive collet and a nonconductive collet insulator configured to electrically insulate the collet from the front body portion;

wherein the collet includes a pin portion that is configured to extend from a forward end of the front body portion and a gripping portion that is configured to receive a center conductor of a hardline coaxial cable;

wherein the collet includes a stepped transition from the pin portion to the gripping portion that is configured to define a forward facing surface at a forward end of the gripping portion of the collet;

wherein the front body portion includes a bore portion that is configured to surround the gripping portion of the collet and includes a substantially constant inside diameter, and the gripping portion of the collet includes a substantially constant outside diameter so as to minimize peaks and valleys of impedance levels within the connector relative to a desired 75 ohm impedance such that the hardline connector is configured to improve return loss performance over a wider frequency bandwidth without degrading electrical, mechanical, and environmental performance of the connector by minimizing peaks and valleys of impedance levels within the connector relative to a desired 75 ohm impedance;

wherein the collet insulator extends from a rearward facing surface of an end wall at the forward end of the front body portion to the forward facing surface at the forward end of the gripping portion of the collet without covering the gripping portion and includes radially spaced apart inner and outer cylindrical walls connected to one another at a forward end by a radial wall and configured to define a hollowed out region so as to minimize peaks and valleys of impedance levels within the connector relative to a desired 75 ohm impedance such that the hardline connector is configured to improve return loss performance over a wider frequency bandwidth without degrading electrical, mechanical, and environmental performance of the connector;

wherein the hardline connector is configured to achieve a return loss of −20 dB or better over a frequency range of 5 MHz to 6 GHz and wherein the hardline connector is configured to achieve an insertion loss of −0.2 dB or better over a frequency range of 5 MHz to 6 GHz.

18. The hardline connector of claim 17, wherein the hardline connector is configured to achieve a return loss of −30 dB to −35 dB or better over a frequency range of 5 MHz to 3 GHz.

19. The hardline connector of claim 17, wherein the hardline connector is configured to achieve an insertion loss of −0.15 dB or better over a frequency range of 5 MHz to 3 GHz.

20. The hardline connector of claim 17, wherein the mid body portion is configured to house a nonconductive seizure bushing and includes a forward end that is configured to be threadedly coupled with a rearward end of the front body portion and a rearward end that is configured to receive the hardline coaxial cable; and wherein a forward facing surface of the seizure bushing includes a plurality of fins that are configured to extend in the forward direction and to be received in a plurality of longitudinal grooves in an inner wall of the front body portion when the mid body portion is threadedly coupled with the front body portion such that the seizure bushing is prevented from rotating relative to the front body portion.

21. The hardline connector of claim 20, wherein the mid body portion is configured to house a conductive mandrel.

22. The hardline connector of claim 21, wherein the mid body portion is configured to house a clamp radially surrounding a portion of the conductive mandrel and a ramp radially surrounding at least a portion of the clamp; and wherein the ramp is configured to be moved forward relative to the clamp when the back nut portion is coupled with the mid body portion such that such that the ramp and the clamp are configured to engage one another, thereby causing the clamp to radially compress an outer conductor of the hardline coaxial cable onto the conductive mandrel.

23. The hardline connector of claim 22, wherein clamp comprises a split ring, and the ramp comprises a tubular ramp.

24. The hardline connector of claim 17, wherein the back nut portion is configured to house a seal driver;

wherein the back nut portion has a forward end that is configured to be threadedly coupled with a rearward end of the mid body portion and to receive the hardline coaxial cable; and wherein the seal driver is configured to be urged in a rearward direction relative to the back nut portion when the back nut portion is threadedly coupled with the mid body portion so as to compress an O-ring to provide a seal between the back nut portion and the hardline coaxial cable.

* * * * *